United States Patent
Yoon et al.

(10) Patent No.: US 11,800,356 B2
(45) Date of Patent: Oct. 24, 2023

(54) METHOD AND DEVICE FOR REMOTE MANAGEMENT AND VERIFICATION OF REMOTE MANAGEMENT AUTHORITY

(71) Applicant: Samsung Electronics Co., Ltd., Suwon-si (KR)

(72) Inventors: Kangjin Yoon, Suwon-si (KR); Jonghoe Koo, Suwon-si (KR); Duckey Lee, Suwon-si (KR); Hyewon Lee, Suwon-si (KR); Taehyung Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 17/249,291

(22) Filed: Feb. 25, 2021

(65) Prior Publication Data

US 2021/0274348 A1    Sep. 2, 2021

(30) Foreign Application Priority Data

Feb. 28, 2020   (KR) .................. 10-2020-0025176
Apr. 16, 2020   (KR) .................. 10-2020-0045973
Jul. 14, 2020   (KR) .................. 10-2020-0086949

(51) Int. Cl.
*H04W 12/76* (2021.01)
*H04W 12/069* (2021.01)
(Continued)

(52) U.S. Cl.
CPC ....... *H04W 12/069* (2021.01); *H04W 12/041* (2021.01); *H04W 12/068* (2021.01); *H04W 12/76* (2021.01)

(58) Field of Classification Search
CPC . H04W 12/069; H04W 12/76; H04W 12/068; H04W 12/041
See application file for complete search history.

(56) References Cited

U.S. PATENT DOCUMENTS 9,831,903 B1 *  11/2017  Narasimhan ........ H04M 17/103
11,340,885 B2 *  5/2022  Zhang .................... G06F 9/4406
(Continued)

FOREIGN PATENT DOCUMENTS

KR    10-2016-0010239 A    1/2016
WO       2019210461 A1    11/2019

OTHER PUBLICATIONS

International Search Report and Written Opinion of the International Searching Authority dated Jun. 1, 2021, in connection with International Application No. PCT/KR2021/002331, 7 pages.
(Continued)

*Primary Examiner* — Techane Gergiso

(57) ABSTRACT

The present disclosure relates a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for remote management and remote management authority verification by a terminal includes: receiving a remote management instruction package; obtaining certificate information configured for a security module, which may be used when remotely managing a security service module corresponding to at least one identifier among a plurality of identifiers; and verifying a remote security service module management certificate of a bundle management server and the remote management instruction package by using the obtained certificate information.

20 Claims, 16 Drawing Sheets

(51) Int. Cl.
*H04W 12/041* (2021.01)
*H04W 12/06* (2021.01)

(56) References Cited

U.S. PATENT DOCUMENTS

| | | | |
|---|---|---|---|
| 2012/0072979 A1* | 3/2012 | Cha | H04W 12/069 726/8 |
| 2015/0127945 A1* | 5/2015 | Chastain | H04L 63/0876 713/170 |
| 2015/0193224 A1* | 7/2015 | Ziat | H04W 12/35 717/172 |
| 2016/0020802 A1 | 1/2016 | Lee et al. | |
| 2016/0316356 A1* | 10/2016 | Li | H04W 12/04 |
| 2017/0222991 A1* | 8/2017 | Yang | H04L 9/0825 |
| 2018/0139612 A1* | 5/2018 | Rhelimi | H04W 12/08 |
| 2018/0279117 A1* | 9/2018 | Chastain | G06F 21/6227 |
| 2019/0007835 A1* | 1/2019 | Li | H04W 12/069 |
| 2019/0074983 A1* | 3/2019 | Yang | H04L 9/3265 |
| 2019/0166488 A1 | 5/2019 | Park et al. | |
| 2019/0313246 A1* | 10/2019 | Nix | H04W 12/30 |
| 2019/0364415 A1 | 11/2019 | Gao et al. | |
| 2020/0092095 A1* | 3/2020 | Yang | H04L 9/0877 |
| 2020/0314639 A1* | 10/2020 | Yu | G06F 21/77 |
| 2021/0011737 A1* | 1/2021 | Yu | H04L 67/303 |
| 2021/0058774 A1 | 2/2021 | Yang et al. | |

OTHER PUBLICATIONS

ETSI TS 103 465 V 15.0.0 (May 2019), Smart Cards; Smart Secure Platform (SSP); Requirements Specification, May 2019, 52 pages.
ETSI TS 103 666-2 V15.0.0 (Nov. 2019), Smart Secure Platform (SSP); Part 2: Integrated SSP (iSSP) characteristics (Release 15), Nov. 2019, 88 pages.
European Patent Office, "Supplementary European Search Report," dated May 19, 2023, in connection with European Patent Application No. 21760998.1, 14 pages.
Samsung, "ETSI Technical Committee Smart Card Platform (TC SCP) TO SCP," SCPREQ(19)000086r2, TO SCP REQ meeting #77, Seoul, Republic of Korea, Jun. 2019, 20 pages.

* cited by examiner

FIG. 10

| Command | Local Management Command | | Remote Management Command | | | | |
|---|---|---|---|---|---|---|---|
| | Allowed | End User consent | Allowed | End User consent | SPBM Verification | Subscriber Consent Verification | SPB Owner Verification |
| Install | YES or NO | YES or NO | YES or NO | YES or NO | x.x.x | YES or NO | y.y.y.y |
| Enable | YES or NO | YES or NO | YES or NO | YES or NO | Key | YES or NO | y.y.y.y |
| Disable | YES or NO | YES or NO | YES or NO | YES or NO | Cert | YES or NO | y.y.y.y |
| Delete | YES or NO | YES or NO | YES or NO | YES or NO | - | YES or NO | y.y.y.y |
| Update Metadata | YES or NO | YES or NO | YES or NO | YES or NO | x.x.x | YES or NO | y.y.y.y |

FIG. 11

| Family ID<br>Custodian ID<br>SPB Owner ID | Subscriber Consent verification method |
|---|---|
| F1, C1, O1 | ORG1_PKID |
| F1, C2, O2 | ORG2_PKID |
| F3, C2 | X_PKID |
| F4 | Y_PKID |
| All | ALL_PKID |
| ... | ... |

METHOD AND DEVICE FOR REMOTE MANAGEMENT AND VERIFICATION OF REMOTE MANAGEMENT AUTHORITY

CROSS-REFERENCE TO RELATED APPLICATIONS

This application is based on and claims priority under 35 U.S.C. 119(a) of a Korean patent application number 10-2020-0025176 filed on Feb. 28, 2020, in the Korean Intellectual Property Office, a Korean patent application number 10-2020-0045973, filed on Apr. 16, 2020, in the Korean Intellectual Property Office, and a Korean patent application number 10-2020-0086949, filed on Jul. 14, 2020, in the Korean Intellectual Property Office, the disclosure of each of which is incorporated by reference herein in its entirety.

BACKGROUND

1. Field

The disclosure relates to a method and a device for remote management and verification of remote management authority and, more specifically, to a method and a device, in which a terminal selects certificate issuer information and a valid certificate or an identifier of a server capable of remotely managing a security service installed in the terminal, and verifies validity of the selected certificate and validity of a remote management command.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Various services can be provided in accordance with the above-described development of a mobile communication system, and a method for efficiently providing these services is thus required. More specifically, there is a need for a method and device, in which a terminal selects a recognizer of a server capable of remotely managing a security service installed in the terminal or a valid certificate and certificate issuer information that may be used when downloading and installing a bundle between the terminal and the server, and verifies validity of the selected certificate.

The above information is presented as background information only to assist with an understanding of the disclosure. No determination has been made, and no assertion is made, as to whether any of the above might be applicable as prior art with regard to the disclosure.

SUMMARY

Disclosed embodiments may provide a device and a method, in which a security service module may be remotely installed in a security module installed in an electronic device, a security service may be provided via the security service module and security information stored in the security module, and the installed security service module is remotely controlled.

Further, disclosed embodiments may provide a device and a method for selecting and verifying a certificate to be used for remote management of bundles classified into different bundle family identifiers, a bundle family identifier and a bundle family manager identifier, or a bundle family identifier, a bundle family manager identifier, and a bundle owner identifier, between a terminal and a bundle management server.

In accordance with an aspect of the disclosure, a method performed by a first entity included in a terminal in a wireless communication system, the method comprising: receiving, from a server, a remote bundle management command; verifying a first bundle policy based on information included in the remote bundle management command and a bundle policy stored in the terminal; transmitting, to a second entity included in the terminal, the remote bundle management command; and receiving, from the second entity, an execution result of the remote bundle management command, wherein a second bundle policy is verified by the second entity, based on the information included in the remote bundle management command and the bundle policy stored in the terminal, and wherein the remote bundle management command is executed by the terminal, based on verification results of the first bundle policy and the second bundle policy.

In some examples, wherein the information included in the remote bundle management command comprises at least one of a bundle identifier, a bundle family identifier of a bundle, a bundle family manager identifier of the bundle, a bundle owner identifier of the bundle, and a remote management command type.

In some examples, wherein the bundle policy stored in the terminal includes at least one of end user consent and bundle management server verification.

In some examples, wherein the verifying of the first bundle policy comprises verifying user consent.

In some examples, wherein verification of the second bundle policy comprises verifying a bundle management server.

In accordance with another aspect of the disclosure, a method performed by a second entity included in a terminal in a wireless communication system, the method comprising:

receiving, from a first entity included in the terminal, a remote bundle management command; verifying a second bundle policy based on information included in the remote bundle management command and a bundle policy stored in the terminal; and transmitting, to the first entity, an execution result of the remote bundle management command, wherein the remote bundle management command is transmitted from a server to the first entity, wherein a first bundle policy is verified by the first entity, based on the information included in the remote bundle management command and the bundle policy stored in the terminal, and wherein the remote bundle management command is executed by the terminal, based on verification results of the first bundle policy and the second bundle policy.

In accordance with another aspect of the disclosure, a first entity included in a terminal, the first entity comprising: a transceiver capable of transmitting or receiving at least one signal, and a controller coupled with the transceiver, wherein the controller is configured to: receive, from a server, a remote bundle management command, verify a first bundle policy based on information included in the remote bundle management command and a bundle policy stored in the terminal, transmit, to a second entity included in the terminal, the remote bundle management command, and receive, from the second entity, an execution result of the remote bundle management command, wherein a second bundle policy is verified by the second entity, based on the information included in the remote bundle management command and the bundle policy stored in the terminal, and wherein the remote bundle management command is executed by the terminal, based on verification results of the first bundle policy and the second bundle policy.

In accordance with another aspect of the disclosure, a second entity included in a terminal, the second entity comprising: a transceiver capable of transmitting or receiving at least one signal, and a controller coupled with the transceiver, wherein the controller is configured to: receive, from a first entity included in the terminal, a remote bundle management command, verify a second bundle policy based on information included in the remote bundle management command and a bundle policy stored in the terminal, and transmit, to the first entity, execution results of the remote bundle management command, wherein the remote bundle management command is transmitted to the first entity from a server, wherein a first bundle policy is verified by the first entity, based on the information included in the remote bundle management command and the bundle policy stored in the terminal, and wherein the remote bundle management command is executed by the terminal, based on verification results of the first bundle policy and the second bundle policy.

According to some embodiments of the disclosure, a method for managing and verifying a remote management certificate by a terminal may include: receiving, from a security service module management server, a remote management instruction package for remotely controlling a specific security service module and a remote security service module management certificate of the security service module management server; obtaining certificate information configured for a security module, which may be used when remotely managing a security service module corresponding to at least one identifier among a security service module owner identifier, a security service module family manager identifier, and a security service module family identifier of the specific security service module; and verifying the remote security service module management certificate of a bundle management server and the remote management instruction package by using the obtained certificate information.

A terminal according to some embodiments of the disclosure may include a transceiver, and at least one processor for performing control to: obtain remote security service module management certificate information that may be used when remotely managing a specific security service module corresponding to at least one identifier among a security service module family identifier and a security service module family manager identifier; and receive, from a bundle management server, a remote management instruction package for remotely controlling the security service module and a remote security service module management certificate of a security service module management server.

According to some embodiments of the disclosure, the one or more processor may perform control to: verify the remote management instruction package for remotely controlling the security service module and the remote security service module management certificate of the security service module management server, based on certificate information configured for a security module, which may be used when remotely managing a security service module corresponding to at least one identifier among a security service module owner identifier, a security service module family manager identifier, and a security service module family identifier of the security service module, which are preconfigured for the security service module; and remotely manage the security service module.

The technical subjects pursued in the disclosure may not be limited to the above mentioned technical subjects, and other technical subjects which are not mentioned may be clearly understood, through the following descriptions, by those skilled in the art to which the disclosure pertains.

According to various embodiments, a terminal can verify and execute a remote bundle management command.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 10 illustrates a diagram of an example of configuring a bundle policy according to some embodiments;

FIG. 11 illustrates a diagram of an example of configuring SSP remote management for remote bundle management according to some embodiments;

DETAILED DESCRIPTION

Figure 1:
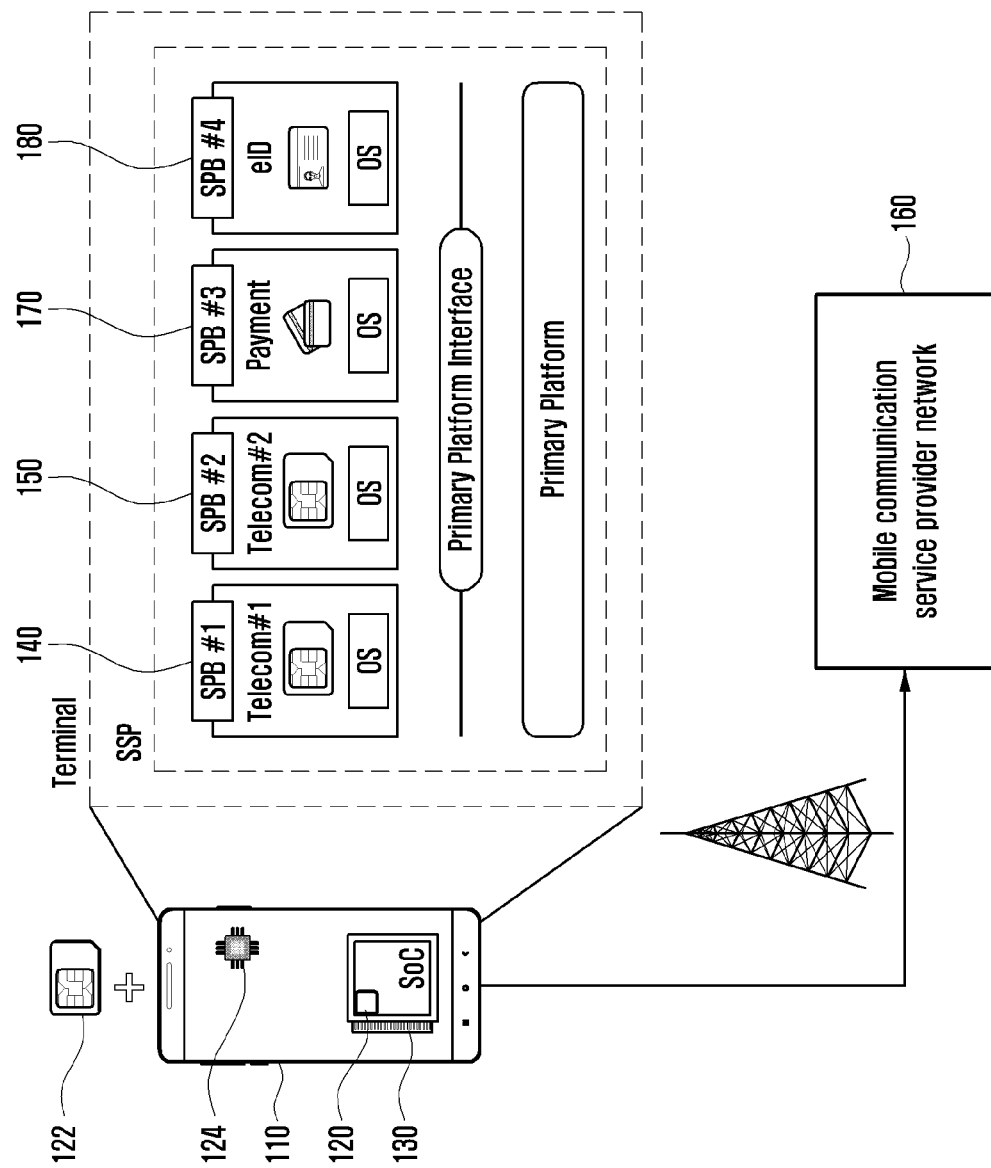
FIG. 1 illustrates a diagram of a method of a mobile communication network connection by a terminal, using a smart secure platform (SSP) equipped with a telecom bundle including a profile according to some embodiments.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Specific terms used in the following description are provided to aid understanding of the disclosure, and the use of these specific terms may be changed in other forms without departing from the technical spirit of the disclosure.

A secure element (SE) refers to a security module including a single chip, which is able to store security information (e.g., a mobile communication network access key, user identification information, such as an ID card/passport, credit card information, an encryption key, etc.) and mount and operate a control module (e.g., a network access control module, such as USIM, an encryption module, a key generation module, etc.) using the stored security information. The SE may be used in various electronic devices (e.g., a smartphone, a tablet, a wearable device, an automobile, an IoT device, etc.), and may provide a security service (e.g., mobile communication network access, payment, user authentication, etc.) via security information and a control module.

The SE may be divided into a universal integrated circuit card (UICC), an embedded secure element (eSE), a smart secure platform (SSP) which is an integrated form of UICC and eSE, and the like, and may be subdivided into a removable type, an embedded type, and an integrated type in which the SE is integrated into a specific device or system on chip (SoC), depending on a type of connection to or installation on an electronic device.

A universal integrated circuit card (UICC) is a smart card inserted into a mobile communication terminal, etc. so as to be used, and is also referred to as a UICC card. A UICC may include an access control module for accessing a network of a mobile communication service provider. Examples of access control modules include a universal subscriber identity module (USIM), a subscriber identity module (SIM), an IP multimedia service identity module (ISIM), etc. A UICC with a USIM is also commonly referred to as a USIM card. Similarly, a UICC including a SIM module is commonly referred to as a SIM card. A SIM module may be mounted when a UICC is manufactured, or a SIM module of a mobile communication service to be used may be downloaded to a UICC card at a time when a user desires. Also, for a UICC card, a plurality of SIM modules may be downloaded and installed, and at least one SIM module thereof may be selected so as to be used. The UICC card may or may not be embedded in a terminal. A UICC embedded in a terminal so as to be used is referred to as ab embedded UICC (eUICC). In particular, a UICC embedded in a system-on-chip (SoC) including a communication processor of the terminal, an application processor of the terminal, or a single processor structure, in which the two processors are integrated, is also referred to as an integrated UICC (iUICC). Typically, an eUICC and an iUICC are embedded in a terminal so as to be used, and may refer to a UICC card capable of remotely downloading and selecting a SIM module. In the disclosure, a UICC card capable of remotely downloading and selecting a SIM module is collectively referred to as an eUICC or an iUICC. That is, among UICC cards capable of remotely downloading and selecting a SIM module, a UICC card which is embedded or not embedded in a terminal is collectively referred to as and used as an eUICC or an iUICC. SIM module information to be downloaded is collectively referred to as the term eUICC profile, iUICC profile or, more simply, profile.

An embedded secure element (eSE) refers to an embedded SE that is fixed to an electronic device so as to be used. An eSE is typically manufactured exclusively for a manufacturer at a request of a terminal manufacturer, and may be manufactured including an operating system and a framework. An eSE remotely downloads and installs an applet-type service control module and may be used for various security service purposes, such as e-wallet, ticketing, e-passport, and digital key. In the disclosure, an SE in a form of a single chip attached to an electronic device capable of remotely downloading and installing a service control module is collectively referred to as an eSE.

A smart secure platform (SSP) is capable of integrated support for UICC and eSE functions on a single chip, and the SSP may be classified as a removable SSP (rSSP), an embedded SSP (eSSP), and an integrated SSP (iSSP) embedded in an SoC. An SSP may include one primary platform (PP) and at least one secondary platform bundle (SPB) operating on the PP, the primary platform may include at least one of a hardware platform and a low level operating system (LLOS), and the secondary platform bundle may include at least one of a high-level operating system (HLOS) and an application executed on the HLOS. The secondary platform bundle is also referred to as an SPB or a bundle. A bundle may access a resource, such as a central processing unit and a memory of the PP, via a primary platform interface (PPI) provided by the PP, and may be thus executed on the PP. A bundle may be equipped with a communication application, such as a subscriber identification module (SIM), a universal SIM (USIM), and an IP multimedia SIM (ISIM), and may also be equipped with various applications, such as e-wallet, ticketing, e-passport, and digital key.

An SSP may be used for the above-described UICC or eSE purposes according to a bundle remotely downloaded and installed, and multiple bundles may be installed on a single SSP and operated concurrently so as to allow a UICC and an eSE to be interchangeably used. That is, if a bundle including a profile operates on an SSP, the SSP may be used for UICC purposes to access a network of a mobile communication service provider. As in an eUICC or an iUICC, a corresponding UICC bundle may remotely download at least one profile into the bundle and select the same, so as to perform operation. If a bundle including a service control module equipped with an application capable of providing a service, such as e-wallet, ticketing, e-passport, or digital key, on an SSP operates on the SSP, the SSP may be used for eSE purposes. A plurality of service control modules may be installed by being integrated into one bundle and operate, or may be installed and operate as respective independent bundles.

Hereinafter, terms used in the disclosure will be described in more detail.

In the disclosure, an SSP is a security module in a form of a chip, which is capable of integrated support for UICC and eSE functions on a single chip, and the SSP may be classified as a removable SSP (rSSP), an embedded SSP (eSSP), and an integrated SSP (iSSP) embedded in an SoC. An SSP may download and install a bundle from an external bundle management server (secondary platform bundle manager, SPB manager) by using an over-the-air (OTA) technology.

In the disclosure, a method of downloading and installing a bundle in an SSP by using the OTA technology may be applied, in the same manner, to a removable SSP (rSSP) that can be inserted in and removed from a terminal, an embedded SSP (eSSP) installed in a terminal, and an integrated SSP (iSSP) included inside an SoC installed in a terminal.

In the disclosure, the term UICC may be used interchangeably with SIM, and the term eUICC may be used interchangeably with eSIM. In the disclosure, the term SSP may be used interchangeably with eUICC and eSIM.

In the disclosure, a secondary platform bundle (SPB) is operated using a resource of a primary platform (PP) of an SSP on the PP, wherein a UICC bundle may refer to software packaging of, for example, an application, a file system, an authentication key value, etc., which are stored in an existing UICC, and an operating system (HLOS) in which the application, the file system, the authentication key value, etc. operate. In the disclosure, a secondary platform bundle may be used interchangeably with a bundle, a profile, and an applet. In the disclosure, a security service module may be used interchangeably with an SSP and a bundle.

In the disclosure, a USIM profile may refer to the same thing as that referred to by a profile, or may refer to software packaging of information included in a USIM application in the profile.

In the disclosure, an operation of enabling a bundle by a terminal or an external server may refer to an operation of performing configuration to change a state of a corresponding profile to an enabled state, so as to enable the terminal to receive a service (e.g., a communication service, a credit card payment service, a user authentication service, etc. via a communication service provider) provided by the bundle. The bundle in the enabled state may be expressed as an "enabled bundle". A bundle in an enabled state may be stored, while being encrypted, in a storage space inside or outside an SSP.

In the disclosure, an enabled bundle may be changed to an active state according to an external input (e.g., a user input, a push, a request of an application in a terminal, an authentication request of a communication service provider, a PP management message, etc.) of the bundle or an operation (e.g., a timer and polling) inside the bundle. A bundle in an active state may refer to being loaded in an operation memory inside an SSP from a storage space inside or outside the SSP, and by using a security control device (secure CPU) inside the SSP, processing security information and providing a security service to a terminal.

In the disclosure, an operation of disabling a bundle by a terminal or an external server may refer to an operation of performing configuration to change a state of the bundle to a disabled state so as to prevent the terminal from receiving a service provided by the bundle. A profile in a disabled state may be expressed as a "disabled bundle". A bundle in an enabled state may be stored, while being encrypted, in a storage space inside or outside an SSP.

In the disclosure, an operation of deleting a bundle by a terminal or an external server may refer to an operation of performing configuration to change a state of the bundle to a deleted state so as to prevent the terminal or the external server from enabling or disabling the bundle. A bundle in a deleted state may be expressed as a "deleted bundle".

In the disclosure, a bundle management server may provide a function of generating a bundle by a request of a service provider or a request of another bundle management server, encrypting the generated bundle, generating a bundle remote management instruction, or encrypting the generated bundle remote management instruction. The bundle management server that provides the above-described function may be expressed as at least one among a secondary platform bundle manager (SPB manager), a remote bundle manager (RBM), an image delivery server (IDS), subscription manager data preparation (SM-DP), subscription manager data preparation plus (SM-DP+), a manager bundle server, managing subscription manager data preparation plus (managing SM-DP+), a bundle encryption server, a bundle generation server, a bundle provisioner (BP), a bundle provider, a bundle provisioning credentials holder (BPC holder).

In the disclosure, the bundle management server may download, install, or update a bundle in an SSP, and may serve to manage key and certificate configurations for remotely managing a state of the bundle. The bundle management server that provides the above-described function may be expressed as at least one among a secondary platform bundle manager (SPBM), a remote bundle manager (RBM), an image delivery server (IDS), subscription manager secure routing (SM-SR), subscription manager secure routing plus (SM-SR+), an off-card entity of eUICC profile manager or a profile management credentials holder (PMC holder), and an eUICC manager (EM).

In the disclosure, a subscription relay server may be expressed as at least one among a secondary platform bundle manager (SPBM), a remote bundle manager (RBM), a secondary platform bundle discovery sever (SPBDS), a bundle discovery sever (BDS), a subscription manager discovery service (SM-DS), a discovery service (DS), a root subscription relay server (root SM-DS), and an alternative subscription relay server (alternative SM-DS). The subscription relay server may receive an event registration request (register event request or event register request) from one or more bundle management servers or subscription relay servers. One or more subscription relay servers may be used in combination, and in this case, a first subscription relay server may receive an event registration request from not only a bundle management server but also a second subscription relay server. In the disclosure, a function of a subscription relay server may be integrated into a bundle management server.

In the disclosure, a bundle management server may collectively refer to a combination of a function of generating, encrypting, and transferring a bundle or a bundle remote management instruction, and a function of configuring an SSP and managing an installed bundle. Further, the bundle management server may collectively refer to a combination of functions of a subscription relay server. Accordingly, in various embodiments, operations of a bundle management server and a subscription relay server may be performed in one bundle management server. Each function may be separately performed by multiple bundle management servers separated from each other. In the specification, a bundle management server or a subscription relay server may be expressed as a bundle server. A bundle server may be one of a bundle management server and a subscription relay server, or may be a device including both a bundle management server and a subscription relay server.

In the disclosure, a bundle management server and a subscription relay server may be collectively referred to as the term SPBM or RBM. A bundle server may be referred to as a bundle management server. A bundle server may be referred to as a security service module management server.

The term "terminal" used in the disclosure may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various embodiments of a terminal may include a cellular phone, a smartphone having a wireless communication function, a personal portable assistant (PDA) having a wireless communication function, a wireless modem, a portable computer having a wireless communication function, a photographing device, such as a digital camera, having a wireless communication function, a gaming device having a wireless communication function, a music storage and playback appliance having a wireless communication function, an Internet appliance enabling wireless Internet access and browsing, as well as portable units or terminals incorporating combinations of functions of Internet appliances. The terminal may include a machine to machine (M2M) terminal and a machine type communication (MTC) terminal/device, but is not limited thereto. In the disclosure, a terminal may also be referred to as an electronic device.

In the disclosure, an SSP capable of downloading and installing a bundle may be embedded in an electronic device. If an SSP is not embedded in an electronic device, the SSP physically separated from the electronic device may be inserted into the electronic device so as to be connected to the electronic device. For example, the SSP may be inserted into the electronic device in a form of a card. The electronic device may include a terminal, and in this case, the terminal may be a terminal including an SSP capable of downloading and installing a bundle. The SSP may not only be embedded in the terminal, but also be inserted into the terminal so as to be connected to the terminal if the terminal and the SSP are separated.

In the disclosure, a terminal or electronic device may include software or an application installed in the terminal or electronic device so as to control an SSP. Software or an application may be referred to as, for example, a local bundle assistant (LBA) or a local bundle manager (LBM). In the disclosure, the term LBA or LBM may be used interchangeably with local profile assistant (LPA).

In the disclosure, a bundle identifier is referred to as a factor matching a bundle identifier (SPB ID), a bundle family identifier (SPB family ID), a bundle family manager identifier (SPB family custodian object ID), a bundle matching ID, and an event identifier (event ID). A bundle identifier (SPB ID) may indicate a unique identifier of each bundle. A bundle family identifier may indicate an identifier that distinguishes a type of a bundle (e.g., a telecom bundle for accessing a mobile communication service network). In the disclosure, a bundle family identifier may be referred to as spbFamilyId. A bundle family manager identifier may indicate an identifier that identifies a subject (e.g., a communication service provider, a terminal manufacturer, a specific group, etc.) that manages a bundle family identifier. In the disclosure, a bundle family manager identifier may be referred to as Oid. A bundle identifier may be used as a value that may index a bundle in a bundle management server. In the disclosure, an SSP identifier (SSP ID) may be a unique identifier of an SSP embedded in a terminal, and may be referred to as sspID. As in the embodiment of the disclosure, if a terminal and an SSP chip are not separated, an SSP identifier may be a terminal ID. An SSP identifier may refer to a specific bundle identifier (SPB ID) in an SSP. In more detail, an SSP identifier may refer to a bundle identifier of a loader (secondary platform bundle loader, SPBL) or a management bundle which performs management to install, enable, disable, and delete another bundle in an SSP. An SSP may have multiple SSP identifiers, and the multiple SSP identifiers may be values derived from a single unique SSP identifier.

In the disclosure, a loader (secondary platform bundle loader, SPBL) may refer to a management bundle which performs management to install, enable, disable, and delete another bundle in an SSP. An LBA of a terminal or a remote server may install, enable, disable, and delete a specific bundle via a loader. In the disclosure, a loader may also be referred to as an SSP.

In the disclosure, bundle provisioning credentials (BPC) may be a means used for mutual authentication between a bundle management server and an SSP, bundle encryption, and signing. BPC may include one or more among a symmetric key, a RIVEST SHAMIR ADLEMAN (RSA) certificate and a private key, an elliptic curved cryptography (ECC) certificate and a private key, a root certification authority (CA), and a certificate chain. If there are multiple bundle management servers, different BPCs for the respective multiple bundle management servers may be stored or used in an SSP.

In the disclosure, profile management credentials (PMC) may be a means used for mutual authentication between a profile management server and an eUICC, transmission data encryption, and signing. PMC may include one or more among a symmetric key, an RSA certificate and a private key, an ECC certificate and a private key, a root CA, and a certificate chain. If there are multiple profile management servers, different PMCs for the respective multiple profile management servers may be stored or used in an eUICC.

In the disclosure, an event may be a term collectively referring to bundle download, remote bundle management, or management/processing instructions of other bundles or SSPs. An event may be named as a remote bundle providing operation (remote bundle provisioning operation or RBP operation) or an event record, and each event may be referred to as data including at least one of a bundle management server, in which the event is stored, an address of a subscription relay server, or each server identifier, and a matching identifier (matching ID or matchingID) or an event identifier (event ID or eventID) corresponding to the event. Bundle download may be used interchangeably with bundle installation. An event type may be used as a term indicating whether a specific event is bundle download, remote bundle management (e.g., delete, enable, disable, replace, update, etc.), or other bundle or SSP management/processing commands, and may be referred to as operation type (or OperationType), operation class (or OperationClass), event request type, event class, event request class, etc.

In the disclosure, a bundle image (or image) may be interchangeably used with a bundle or may be used as a term indicating a data object of a specific bundle, and may be referred to as a bundle TLV or a bundle image TLV. If a bundle image is encrypted using an encryption parameter, the bundle image may be referred to as a protected bundle image (PBI) or a protected bundle image TLV (PBI TLV). If a bundle image is encrypted using an encryption parameter which can be decrypted only by a specific SSP, the bundle image may be referred to as a bound bundle image (BBI) or a bound bundle image TLV (BBI TLV). A bundle image TLV may be a data set representing information constituting a profile in a TLV (tag, length, and value) format.

In the disclosure, local bundle management (LBM) may be referred to as bundle local management, local management, a local management command, a local command, an LBM package, a bundle local management package, a local management package, a local management command package, and a local command package. LBM may be used to change a state (enabled, disabled, or deleted) of a specific bundle or to modify (update) contents (e.g., bundle nickname or bundle metadata) of the specific bundle via software installed in a terminal. LBM may include one or more local management commands, and in this case, bundles subject to the local management commands may be the same or different from each other for the local management commands, respectively.

In the disclosure, remote bundle management (RBM) may be referred to as bundle remote management, remote management, a remote management command, a remote command, a remote bundle management package (RBM package), a bundle remote management package, a remote management package, a remote management command package, and a remote command package. RBM may be used to change a state (enabled, disabled, or deleted) of a specific bundle or to modify (update) contents (e.g., a bundle nickname, bundle summary information (bundle metadata), or the like) of the specific bundle. RBM may include one or more remote management commands, and bundles subject to the remote management commands may be the same or different from each other for the remote management commands, respectively.

In the disclosure, a target bundle may be used as a term referring to a bundle that is subject to a local management command or a remote management command.

In the disclosure, a certificate or a digital certificate may represent a digital certificate used for mutual authentication based on an asymmetric key including a pair of a public key (PK) and a secret key (SK). Each certificate may include one or more public keys (PKs), public key identifiers (PKIDs) corresponding to the respective public keys, and an identifier (certificate issuer ID) and a digital signature of a certificate issuer (CI) having issued a corresponding certificate. A certificate issuer may be referred to as a certification issuer, a certificate authority (CA), a certification authority, or the like. In the disclosure, a public key (PK) and a public key identifier (public key ID, PKID) may be used interchangeably with a storage space which stores: a specific public key or a certificate including the public key; a part of a specific public key or a part of a certificate including the public key; a calculation result of a specific public key or a calculation result (e.g., hash) value of a certificate including the public key; a calculation result (e.g., hash) value of a part of a specific public key or a calculation result (e.g., hash) value of a part of a certificate including the public key; or data.

In the disclosure, if certificates (primary certificates) issued by one certificate issuer are used to issue other certificates (secondary certificates), or if secondary certificates are used to connectively issue third or more certificates, correlations of corresponding certificates may be referred to as a certificate chain or a certificate hierarchy, wherein a CI certificate used for issuing an initial certificate may be referred to as a root of certificate, a highest certificate, a root CI, a root CI certificate, a root CA, a root CA certificate, and the like.

In the disclosure, a service provider may indicate an enterprise which issues a request to a bundle management server so as to request bundle generation, and provides a service to a terminal via the generated bundle. For example, a service provider may represent a communication service provider (mobile operator or operator) which provides a communication network access service via a bundle equipped with a communication application, and may collectively refer to all of a business supporting system (BSS), an operational supporting system (OSS), a point of sale terminal, and other IT systems of the communication service provider. In the disclosure, a service provider is not limited to expressing only one specific enterprise, and may be used as a term to refer to a group or association (or consortium) of one or more enterprises, or an agency (representative) representing the group or association. In the disclosure, a service provider may be referred to as a business operator (operator or OP or Op.), a bundle owner (BO), an image owner (Image Owner, IO), etc., and each service provider may configure or be assigned at least one name and/or unique identifier (object identifier (OID)). If a service provider refers to a group, association, or representative of one or more enterprises, a name or a unique identifier of the group, association, or representative may be a name or a unique identifier shared by all enterprises belonging to the group or association, or all enterprises cooperating with the representative.

In the disclosure, a terminal manager (device manager) may issue requirements to a bundle management server or a service provider so as to request generate a bundle, may subscribe to a service of the service provider, and may indicate an enterprise that provides a service via the bundle to an SSP of a terminal managed by the device manager. A device manager may be a service subscriber who has signed a contract with a service provider and subscribed to a service provided by the service provider. For example, a device manager may represent a business operator or an M2M service provider, which provides and uses a remote measurement service by using an IoT terminal, and may refer to an enterprise or a terminal manufacturer which manufactures and sells a terminal. In the disclosure, a device manager is not limited to expressing only one specific enterprise, and may be used as a term to refer to a group or association (or consortium) of one or more enterprises, or an agency (representative) representing the group or association. In the disclosure, a device manager may be referred to as a bundle owner (BO), a bundle manager, an image owner (IO), a service subscriber, etc., and each device manager may configure or be assigned at least one name and/or a unique identifier (object identifier (OID)). If a device manager refers to a group, association, or representative of one or more enterprises, a name or a unique identifier of the group, association, or representative may be a name or a unique identifier shared by all enterprises belonging to the group or association, or all enterprises cooperating with the representative.

In the disclosure, AKA may indicate authentication and key agreement, and may indicate an authentication algorithm for accessing 3GPP and 3GPP2 networks.

In the disclosure, K (or K value) may be an encryption key value stored in an eUICC, which is used in an AKA authentication algorithm.

In the disclosure, OPc may be a parameter value which may be stored in an eUICC and used in the AKA authentication algorithm.

In the disclosure, an NAA is a network access application, and may be an application program, such as USIM or ISIM, which is stored in a UICC so as to access a network. An NAA may be a network access module.

In the disclosure, a telecom bundle may be a bundle which is equipped with at least one NAA or equipped with a function to download remotely and install at least one NAA. In the disclosure, a telecom bundle may include a telecom bundle identifier indicating the same.

In addition, in describing the disclosure, when it is determined that a detailed description of a related known function or configuration may unnecessarily obscure a subject matter of the disclosure, the detailed description thereof will be omitted.

Hereinafter, various embodiments of a method and a device for installing and managing a bundle online via a remote server will be described.

FIG. 1 illustrates a diagram of a method of a mobile communication network connection by a terminal, using a smart secure platform (SSP) equipped with a telecom bundle including a profile according to some embodiments.

As illustrated in FIG. 1, an SSP 120 may be embedded in an SoC 130 of a terminal 110. The SoC 130 may be a communication processor, an application processor, or a processor in which the two processors are integrated. The SSP 120 may be a removable type 122 in a form of an independent chip without being integrated into the SoC, or may be an embedded type 124 previously embedded in the terminal 110.

A bundle with a profile may indicate to include "access information" which may enable access to a specific communication service provider. For example, the access information may be an international mobile subscriber identity (IMSI) that is a subscriber identifier, and a K or Ki value required, in addition to the subscriber identity, for authentication to a network.

The terminal 110 may perform authentication with an authentication processing system (e.g., home location register (HLR) or authentication center (AuC)) of a mobile communication service provider by using at least one of telecom bundles 140 and 150 installed inside the SSP 120. For example, the authentication processing may be an authentication and key agreement (AKA) procedure. If authentication is successful, the terminal 110 may use a mobile communication service, such as using mobile data or a phone, by means of a mobile communication network 160 of a mobile communication system. Each of the two telecom bundles 140 and 150 may store different authentication information, and the terminal 110 may cause the two telecom bundles 140 and 150 to operate concurrently or in time division according to a configuration, to use the mobile communication network.

The terminal 110 may use online payment via a terminal application or may use offline payment via an external credit card point-of-sale (PoS) device, by using a payment bundle 170 installed in the SSP 120, and identity of a terminal owner may be authenticated using an electronic identification card (eID) bundle 180.

Figure 2:
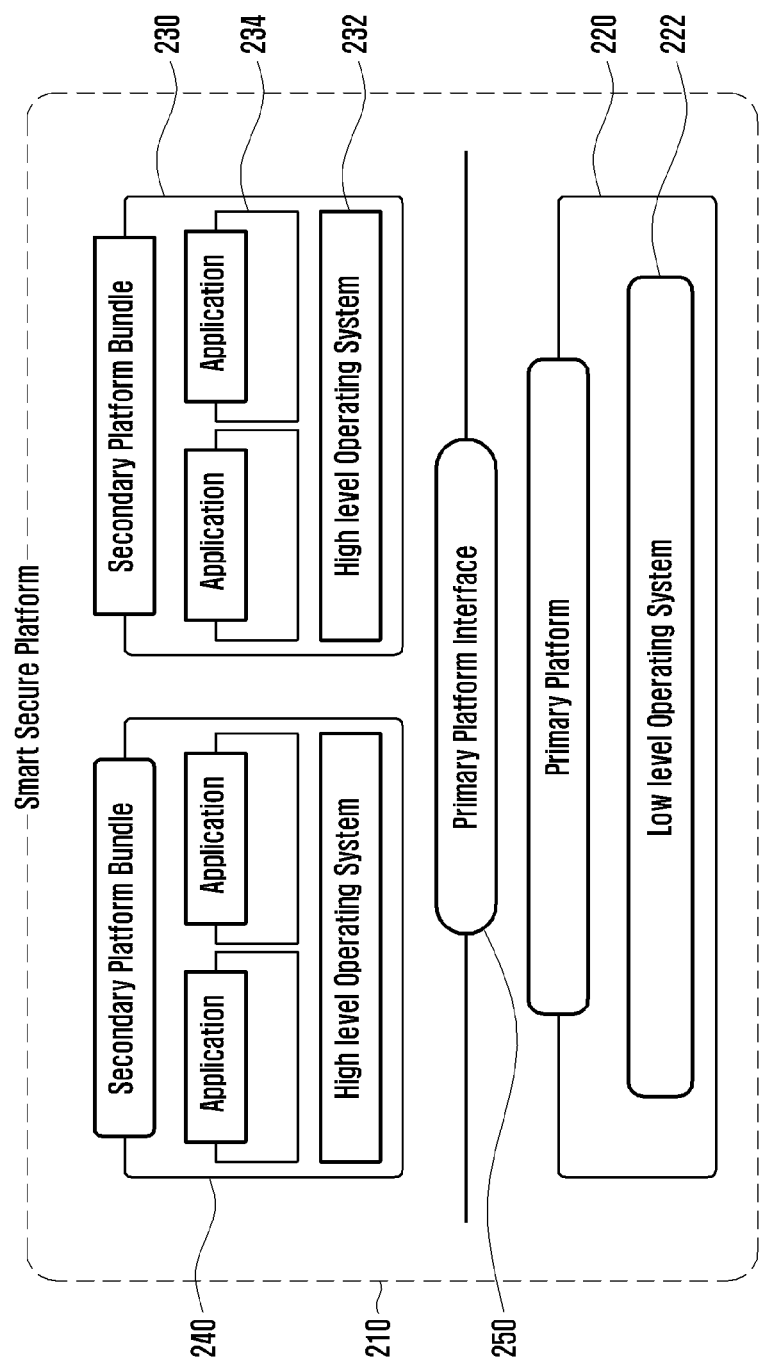
FIG. 2 illustrates a conceptual diagram of an internal structure of an SSP according to some embodiments.

FIG. 2 illustrates a conceptual diagram of an internal structure of an SSP according to some embodiments.

In FIG. 2, an SSP 210 may include one primary platform (PP) 220, and one or more secondary platform bundles (SPBs) 230 and 240 operating thereon. The primary platform 220 may include hardware (not shown) and at least one low-level operating system (LLOS) 222. The secondary platform bundle 230 may include a high-level operating system (HLOS) 232 and at least one application 234 operating thereon. Each of the secondary platform bundles 230 and 240 may access resources of a central processing device, a memory, etc. of the primary platform 220 so as to operate on the SSP 210, by using a primary platform interface (PPI) 250.

Figure 3:
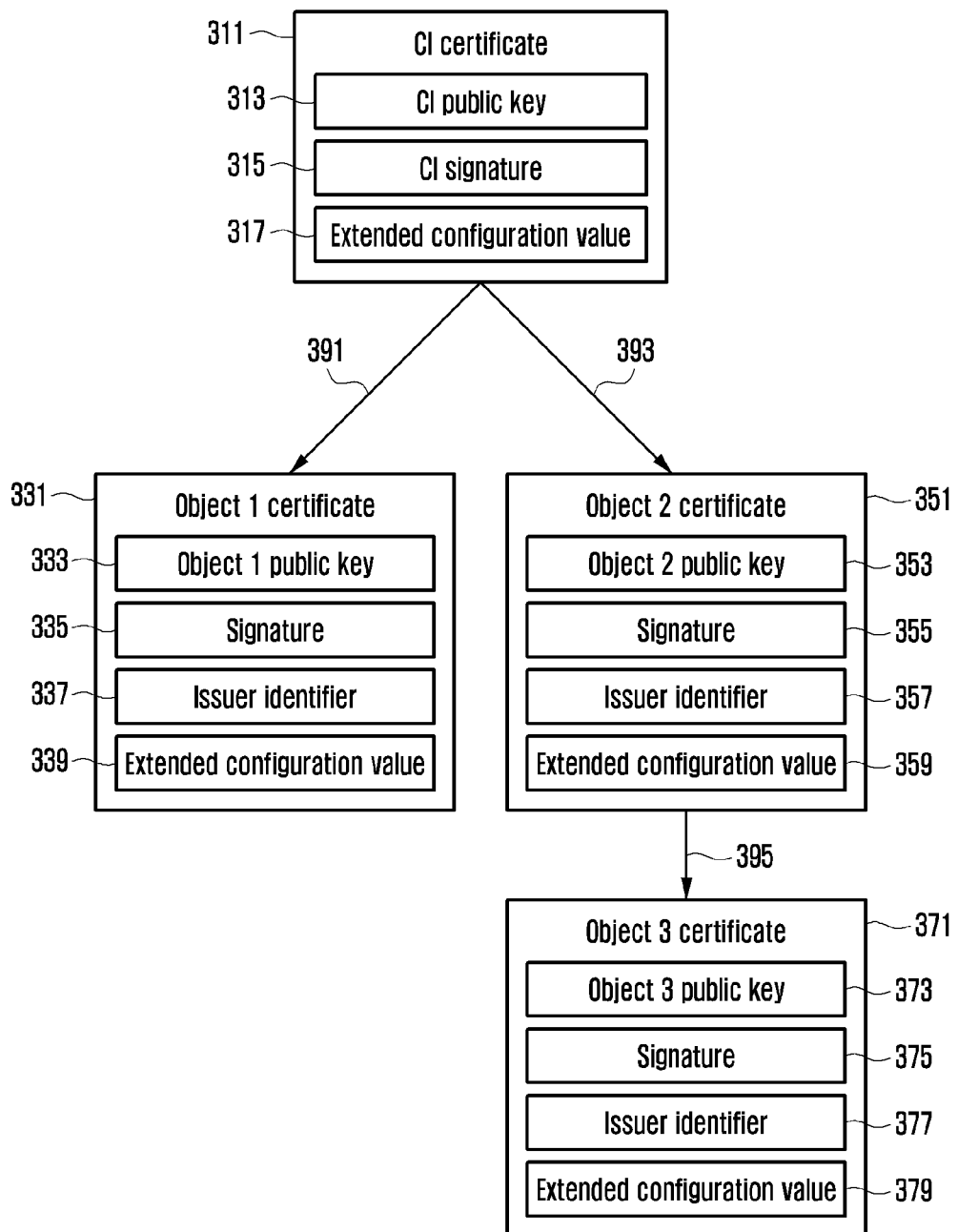
FIG. 3 illustrates a diagram of examples of a hierarchy (certificate hierarchy or certificate chain) of certificates issued by a certificate issuer (CI), a public key included in each certificate, and a digital signature configuration of the certificate issuer (CI) according to some embodiments.

FIG. 3 illustrates a diagram of examples of a hierarchy (certificate hierarchy or certificate chain) of certificates issued by a certificate issuer (CI), a public key included in each certificate, and a digital signature configuration of the certificate issuer (CI) according to some embodiments. In the disclosure, a certificate issuer (CI) may be used interchangeably with a certificate authority (CA).

Referring to FIG. 3, a certificate issuer (CI) may generate a public key 313 and a secret key which are to be used by the certificate issuer itself, may generate a CI certificate (certificate issuer certificate) 311 including the public key 313 of the two generated keys in its own certificate, and may attach a digital signature 315 generated using the secret key thereof to the certificate of the certificate issuer itself.

Referring to FIG. 3, the CI certificate 311 may be used to issue 391 an object 1 certificate 331. Object 1 may be, for example, a bundle management server (SPBM). Object 1 may generate a public key 333 and a secret key which are to be used thereby, and may generate the object 1 certificate 331 including the public key 333 of the two generated keys in its own certificate. Object 1 may transmit a request to the certificate issuer (CI), so as to receive a digital signature (CI digital signature) 335 of the certificate issuer by using the secret key (CI secret key) of the certificate issuer. The object 1 certificate 331 may include an identifier 337 of the certificate issuer, which correspond to the public key (CI public key) 313 of the certificate issuer, which should be used at verification of the digital signature 335 of the certificate issuer, which is included in the object 1 certificate 331. The identifier 337 of the certificate issuer may include at least one of a public key identifier (CI public key ID) and a CI identifier (CI ID, CI object ID, object universally unique identifier, or object UUID) of the certificate issuer.

Referring to FIG. 3, the CI certificate 311 may be used to issue 393 an object 2 certificate 351. Object 2 may be, for example, an SSP manufacturer (SSP maker). Object 2 may generate a public key 353 and a secret key which are to be used thereby, and may generate the object 2 certificate 351 by including the public key 353 of the two generated keys in its own certificate. Object 2 may transmit a request to the certificate issuer so as to receive a digital signature (CI digital signature) 355 of the certificate issuer by using the secret key (CI secret key) of the certificate issuer. The object 2 certificate 351 may include an identifier 357 of the certificate issuer, which corresponds to the public key (CI public key) 313 of the certificate issuer, which should be used at verification of the digital signature 355 of the certificate issuer, which is included in the object 2 certificate 351. The identifier 357 of the certificate issuer may include at least one of a public key identifier (CI public key ID) and a CI identifier (CI ID, CI object ID, object universally unique identifier, or object UUID) of the certificate issuer. The certificate issuer signatures 335 and 355 included in the object 1 certificate 331 and the object 2 certificate 351 may have different values, but the public key identifier 357 of the certificate issuer may have the same value.

Referring to FIG. 3, the object 2 certificate 351 may be used to issue 395 an object 3 certificate 357. Object 3 may be, for example, an SSP manufactured by an SSP manufacturer (SSP maker) or a secondary platform bundle loader (SPBL) mounted inside the SSP. Object 3 may generate a public key 373 and a secret key which are to be used thereby, and may generate the object 3 certificate 371 including the public key 373 of the two generated keys in its own certificate. Object 3 may transmit a request to object 2 so as to receive a digital signature 375 of object 2 by using the secret key of object 2. The object 3 certificate 371 may include an identifier 377 corresponding to the public key 353 of object 2, which should be used at verification of the digital signature 375 of object 2, which is included in the object 3 certificate 371. The identifier 377 may include at least one of an issuer identifier (object ID or object universally unique identifier (object UUID)) and a public key identifier (public key ID) of the issuer.

Although not illustrated in FIG. 3, at least one sub-certificate issuer (sub CI or sub-certificate authority (sub CA)) may exist between the certificate issuer (CI), object 1, and object 2. A sub-certificate issuer certificate may be issued by the certificate issuer (CI) by means of the CI certificate 311, or may be issued by another sub-certificate issuer by means of its own sub-certificate issuer certificate. A sub-certificate issuer may issue an object 1 certificate or an object 2 certificate by using a certificate of the sub-certificate issuer.

Although not illustrated in FIG. 3, at least one sub-certificate issuer (sub CI or sub-certificate authority (sub CA)) may exist between object 2 and object 3. A sub-certificate issuer certificate may be issued by object 2 by means of the object 2 certificate 351, or may be issued by another sub-certificate issuer by means of its own sub-certificate issuer certificate. The sub-certificate issuer may issue an object 3 certificate and an object 2 certificate by using its own sub-certificate issuer certificate.

Referring to FIG. 3, extended configuration values 317, 339, 359, and 379 of the respective certificates 311, 331, 351, and 371 may include bundle family identifiers (SPB Family IDs), or bundle family identifiers (SPB Family IDs) and bundle family manager identifiers (SPB family custodian object IDs) of bundles which may be downloaded and installed in the corresponding certificates.

The object 1 certificate 331, the object 2 certificate 351, and the object 3 certificate 371 illustrated in the example of FIG. 3 may all have the same CI certificate 311 as a highest certificate or a root of certificate. Accordingly, in order for object 1, object 2, and object 3 to authenticate each other, the CI certificate 311 or the CI public key 313 included therein may be required. More specifically, in the example of FIG. 3, in order for object 1 and object 2 to authenticate each other by using the digital certificate and signature, object 1 may need the signature of object 2, the object 2 certificate 351, and the CI public key 313, and object 2 may need the signature of object 1, the object 1 certificate 331, and the CI public key 313. More specifically, in the example of FIG. 3, in order for object 1 and object 3 to authenticate each other by using the digital certificate and signature, object 1 may require the signature of object 3, the object 3 certificate 371, the object 2 certificate 351, and the CI public key 313, and object 3 may require the signature of object 1, the object 1 certificate 331, and the CI public key 313. In this case, for the object 3 certificate 371, the object 2 certificate 351 may be referred to as a sub-certificate issuer (sub CI or sub-certificate authority (sub CA)) certificate.

Figure 4:
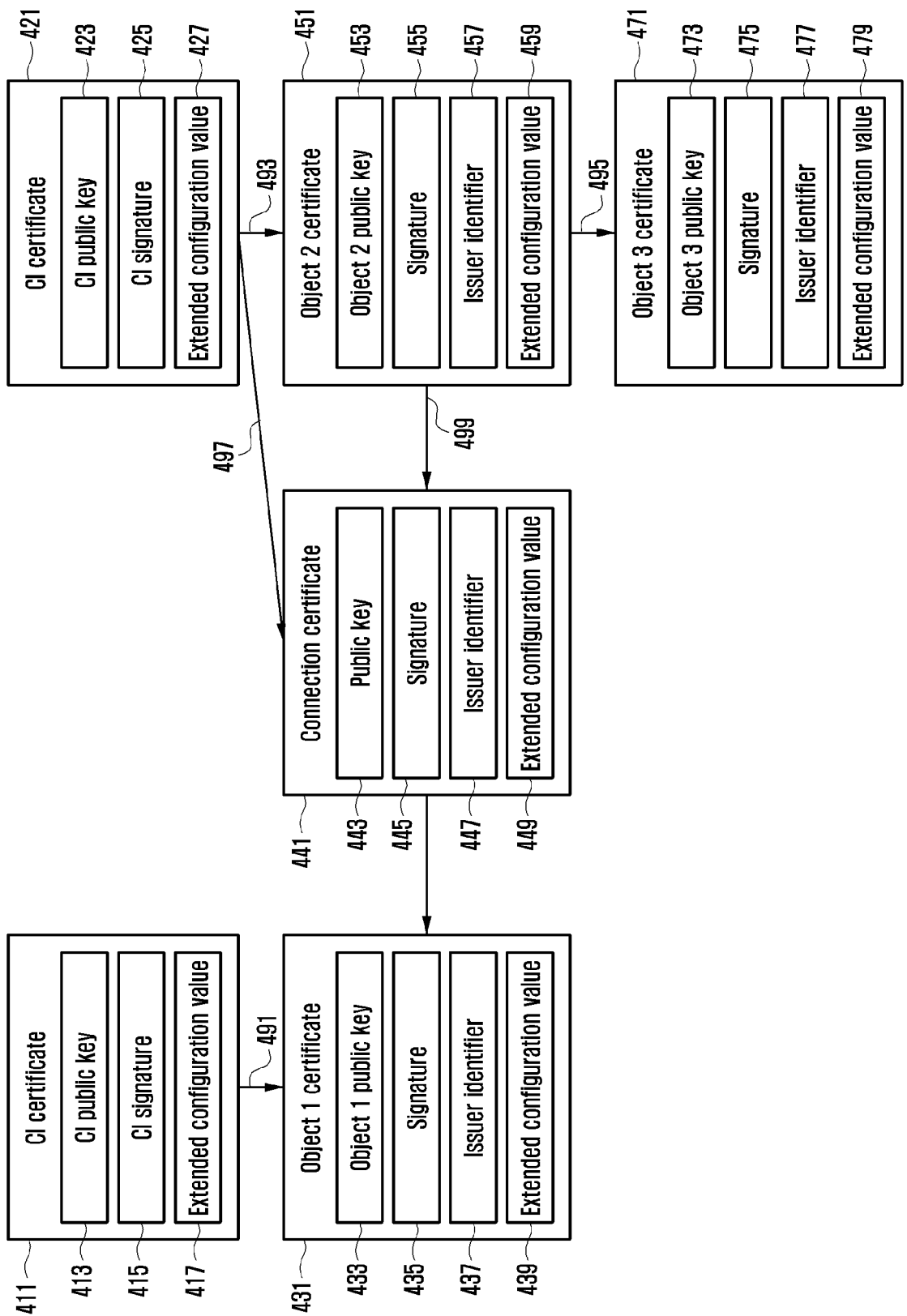
FIG. 4 illustrates a diagram of examples of a hierarchy (certificate hierarchy or certificate chain) of certificates issued by a certificate issuer (CI), a public key included in each certificate, and a digital signature configuration of the certificate issuer (CI) according to some embodiments.

FIG. 4 illustrates a diagram of examples of a hierarchy (certificate hierarchy or certificate chain) of certificates issued by a certificate issuer (CI), a public key included in each certificate, and a digital signature configuration of the certificate issuer (CI) according to some embodiments.

Referring to FIG. 4, a CI certificate 421 may be used to issue 497 a connection certificate 441, or an object 2 certificate 451 may be used to issue 499 the connection certificate 441. Sub-certificate issuer certificates (not illustrated), which may exist between the CI certificate 421 and the object 2 certificate 451 and between the object 2 certificate 451 and an object 3 certificate 471, may be used to issue the connection certificate 441. The connection certificate 441 may receive a digital signature 445 by using a secret key of an issuer. The connection certificate 441 may include an identifier 447 corresponding to a public key of the issuer, which should be used at verification of the signature 445 included in the connection certificate 441. The identifier 447 may include at least one of an issuer identifier (object ID or object universally unique identifier (object UUID)) and a public key identifier (public key ID) of the issuer. The public key 443 of the connection certificate 441 may be a value corresponding to the issuer identifier 447 of an object 1 certificate 431, or a value corresponding to issuer identifiers of sub-issuer certificates (not illustrated) which may exist between the CI certificate 411 and the object 1 certificate 431. An extended configuration value 449 of the connection certificate 441 may include a bundle family identifier (SPB Family ID), or a bundle family identifier (SPB Family ID) and a bundle family manager identifier (SPB family custodian object ID) of a bundle that the issuer has allowed object 1 to download to object 3 to a corresponding certificate.

Referring to FIG. 4, extended configuration values 417, 427, 439, 449, 459, and 479 of the respective certificates 411, 421, 431, 441, 451, and 471 may include bundle family identifiers (SPB Family IDs), or bundle family identifiers (SPB Family IDs) and bundle family manager identifiers (SPB family custodian object IDs) of bundles which may be downloaded and installed in the corresponding certificates.

Although not illustrated in FIG. 4, at least one sub-certificate issuer (sub CI or sub-certificate authority (sub CA)) may exist between the certificate issuer (CI), object 1, and object 2. A sub-certificate issuer certificate may be issued by the certificate issuer (CI) by means of the CI certificate 411, or may be issued by another sub-certificate issuer by means of its own sub-certificate issuer certificate. A sub-certificate issuer may issue an object 1 certificate or an object 2 certificate by using a certificate of the sub-certificate issuer. An extended configuration value of a sub-certificate issuer certificate may include a bundle family identifier (SPB Family ID), or a bundle family identifier (SPB Family ID) and a bundle family manager identifier (SPB family custodian object ID) of a bundle which may be downloaded and installed in the corresponding certificate.

Although not illustrated in FIG. 4, at least one sub-certificate issuer (sub CI or sub-certificate authority (sub CA)) may exist between object 2 and object 3. A sub-certificate issuer certificate may be issued by object 2 by means of the object 2 certificate 451, or may be issued by another sub-certificate issuer by means of its own sub-certificate issuer certificate. The sub-certificate issuer may issue an object 3 certificate and an object 2 certificate by using its own sub-certificate issuer certificate.

Referring to FIG. 4, the illustrated object 1 certificate 431 and object 2 certificate 451 may have different CI certificates 411 and CI certificates 421, as highest certificates or root of certificates, respectively. Accordingly, in order for object 2 and object 3 to authenticate object 1, the CI certificate 411 and/or a CI public key 413 included therein may be required. In order for object 1 to authenticate object 2 and object 3, the CI certificate 421 and/or a CI public key 423 included therein may be required. More specifically, in the example of FIG. 4, in order for object 1 and object 2 to authenticate each other by using the digital certificates and signatures, object 1 may require a signature of object 2, the object 2 certificate 451, and the CI public key 423, and object 2 may require a signature of object 1, the object 1 certificate 431, and the CI public key 413. In the example of FIG. 4, in order for object 1 and object 3 to authenticate each other by using the digital certificates and signatures, object 1 may require a signature of object 3, the object 3 certificate 471, the object 2 certificate 451, and the CI public key 423, and object 3 may require the signature of object 1, the object 1 certificate 431, and the CI public key 413.

Referring to FIG. 4, in order for object 3 to authenticate object 1, the connection certificate 441, the CI certificate 421, and/or the public key 423 included therein may be required. More specifically, in the example of FIG. 4, in order for object 3 to authenticate object 1 by using the digital certificate and signature of object 1, object 3 may require the signature of object 1, the object 1 certificate 431, the connection certificate 441, and the CI public key 423. In order for object 3 to authenticate object 1, the connection certificate 441, the object 2 certificate 451, the CI certificate 421, and/or the public key 423 included therein may be required. More specifically, in the example of FIG. 4, in order for object 3 to authenticate object 1 by using the digital certificate and signature of object 1, object 3 may require the signature of object 1, the object 1 certificate 431, the connection certificate 441, the object 2 certificate 451, and the CI public key 423.

Figure 5:
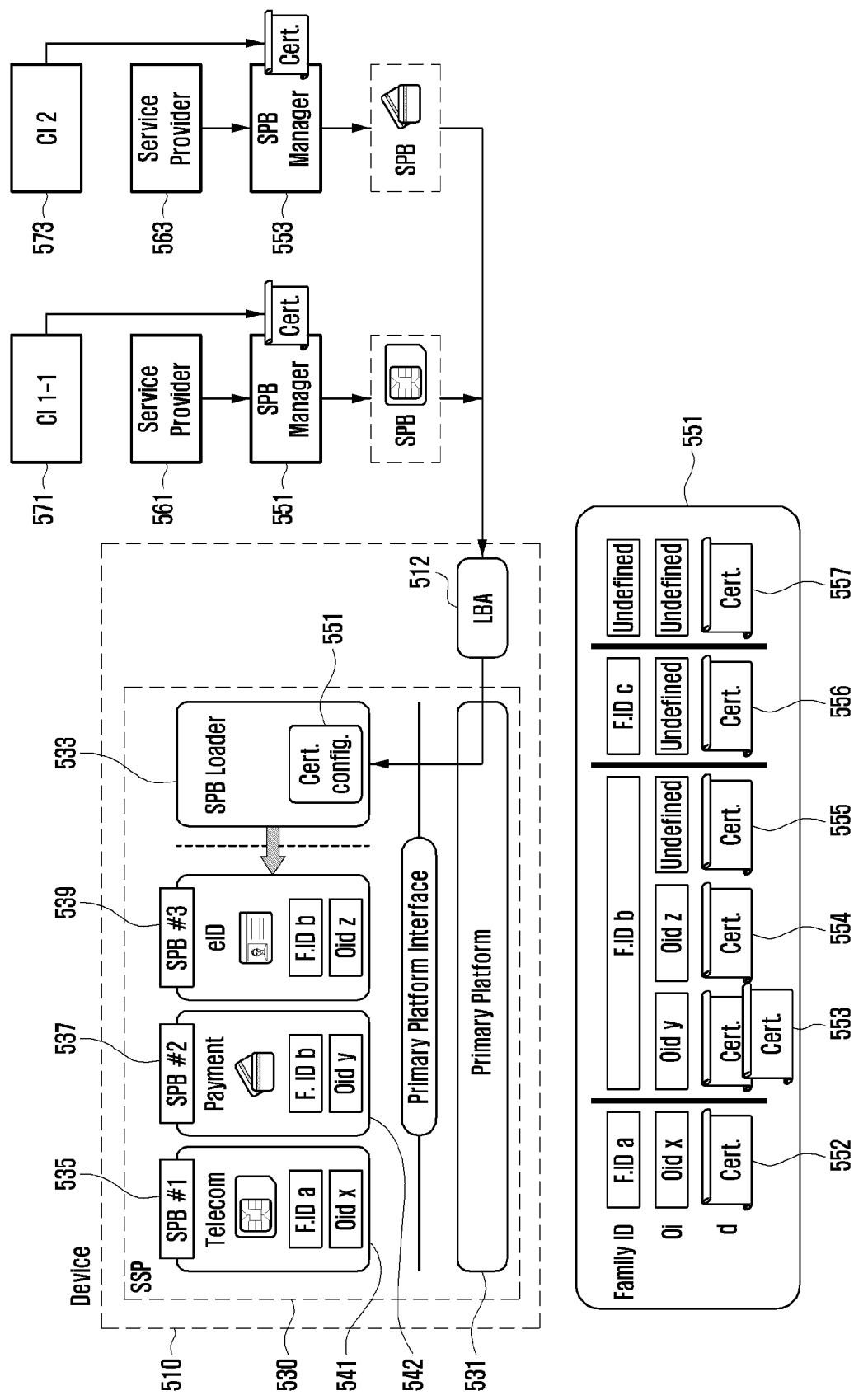
FIG. 5 illustrates a diagram of examples of internal and external elements of a terminal, for allowing the terminal to download and install a bundle via an SSP according to some embodiments.

FIG. 5 illustrates a diagram of examples of internal and external elements of a terminal, for allowing the terminal to download and install a bundle via an SSP according to some embodiments.

In FIG. 5, a terminal 510 may be a terminal in which an SSP 530 is mounted and an LBA 512 for controlling the SSP 530 is installed. The SSP 530 may be embedded in the terminal 510 or may be removable. The SSP 530 may include a primary platform 531, a secondary platform bundle loader (SPBL) 533, and one or more secondary platform bundles 535, 537, or 539. The secondary platform bundle 535, 537, or 539 may not be installed in the SSP 530 when the terminal is shipped, but may be downloaded remotely and installed after shipment.

Referring to FIG. 5, respective bundles may have different bundle family identifiers, or different bundle family identifiers and bundle family manager identifiers 541 or 542. The SSP 530 or the SPBL 533 may store and manage a certificate configuration 551 that is allowed to be used to download and install bundles having different bundle family identifiers, or bundle family identifiers and bundle family manager identifiers. The LBA 512 may request the certificate configuration 551 from the SSP 530 or the SPBL 533, and the certificate configuration may be duplicated and stored in the LBA 512.

Referring to FIG. 5, the SSP 530 or the SPBL 533 may store and manage certificate information 552, 553, or 554 to which different family identifiers and different bundle family manager identifiers are assigned. The certificate information 552, 553, or 554, to which the family identifiers and the bundle family manager identifiers are assigned, may be used to download bundles including the assigned family identifiers and bundle family identifiers. The SSP 530 or the SPBL 533 may refuse to download and install a bundle that does not include the family identifier and bundle family identifier assigned to the corresponding certificate information 552, 553, or 554.

Referring to FIG. 5, different bundle family identifiers are assigned to the SSP 530 or the SPBL 533, and the SSP 530 or the SPBL 533 may store and manage certificate information 555 or 556 to which the bundle family manager identifier is not assigned. The certificate information 555 or 556 to which the family identifier is assigned may be used to download a bundle including the assigned family identifier.

Referring to FIG. 5, the SSP 530 or the SPBL 533 may store and manage certificate information 557 to which the bundle family identifier and the bundle family manager identifier are not assigned.

The certificate information 552, 553, 554, 555, 556, and 557 stored and managed by the SSP 530 or the SPBL 533 in FIG. 5 may be the CI certificates, the public key identifiers of the CI certificates, the certificates existing on the certificate hierarchy, which are issued by the certificate issuer (CI), or public key identifiers of the corresponding certificates, in FIG. 3 or FIG. 4. When a bundle is downloaded from a bundle management server 551 or 553 and installed, the SSP 430 or the SPBL 433 may select certificate information configured for the bundle family identifier assigned to the bundle or certificate information configured for the bundle family identifier and bundle family manager identifier assigned to the bundle, and may transfer the information to the bundle management server 551 or 553. The certificate information may be the certificate or the public key of the certificate issuer (CI) of the certificate hierarchy, and may be an identifier (e.g., CI ID, CI ID, CI object ID, object universally unique identifier, (object UUID), or CI public key ID) corresponding to the certificate and public key.

Figure 6:
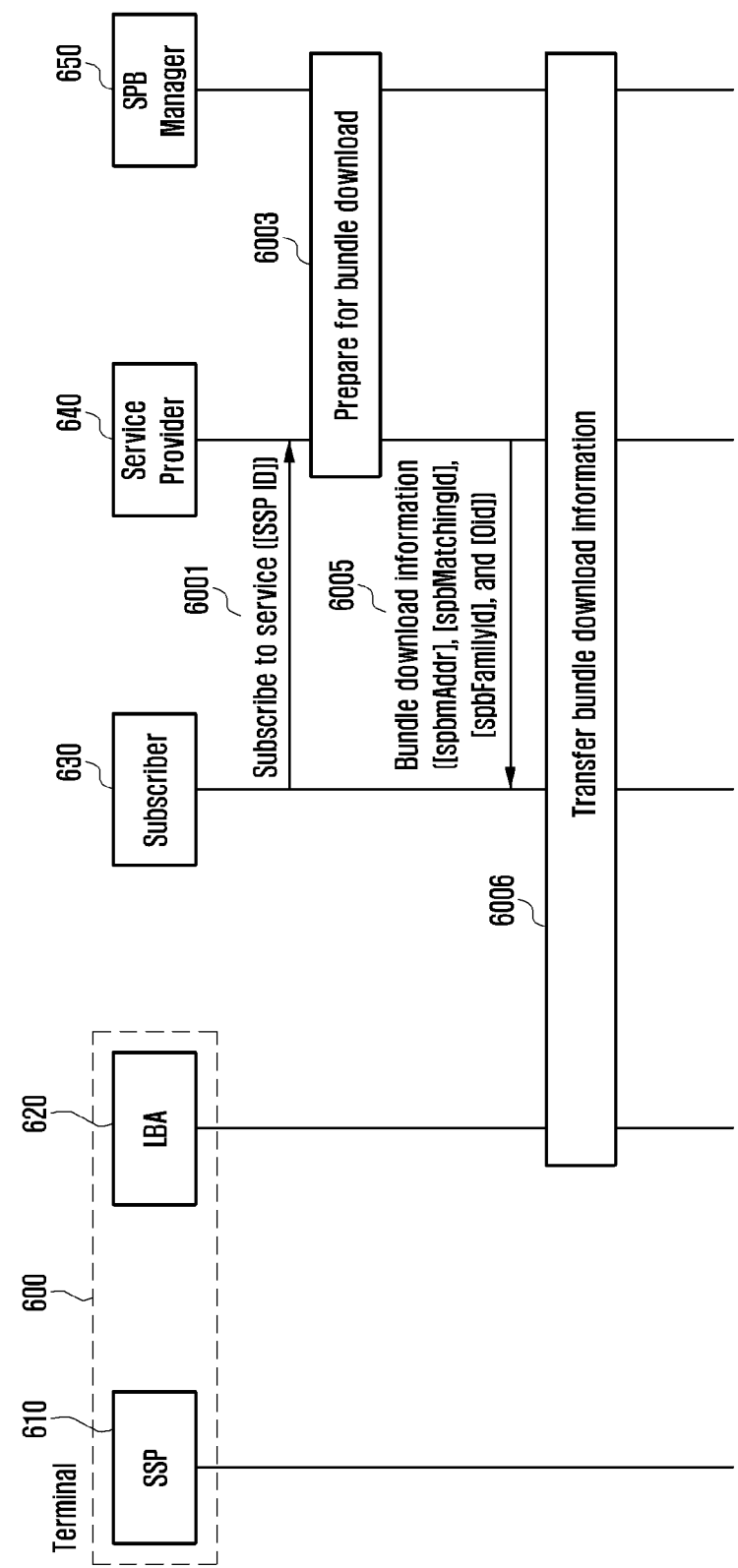
FIG. 6 illustrates a diagram of an example of a procedure in which a subscriber subscribes to a service via a service provider, and the service provider and a bundle management server prepare to download a bundle according to some embodiments.

FIG. 6 illustrates a diagram of an example of a procedure in which a subscriber subscribes to a service via a service provider, and the service provider and a bundle management server prepare to download a bundle according to some embodiments.

In FIG. 6, a terminal 600 may be a terminal in which an SSP 610 is mounted and an LBA 620 for controlling the SSP 610 is installed. Although not illustrated in the drawing, in a bundle management server 650, a bundle requested by a service provider 640 may be generated and waiting, and the service provider 640 may have at least one of a bundle identifier (SPB ID), a bundle family identifier (SPB family ID), a bundle family manager identifier (SPB family custodian object ID), and an address (SPBM Addr) of the bundle management server 650 for the generated bundle.

Referring to FIG. 6, in operation 6001, a subscriber 630 may select and subscribe to a service (e.g., a data service via a mobile communication network, etc.) provided by the service provider 640. The subscriber 630 may selectively transfer, to the service provider 640, an identifier (SSP ID) of the SSP 610 installed in the terminal 600, in which the bundle is to be installed, in order to use the service provided by the service provider 640.

In operation 6003, the service provider 640 and the bundle providing server 650 may perform a bundle download preparation procedure. In operation 6003, the service provider 640 may selectively transfer the identifier (SSP ID) of the SSP 610, in which the bundle is to be installed, to the bundle management server 650, and may transfer, to the bundle management server 650, at least one of a specific bundle identifier (SPB ID), a bundle family identifier (SPB family ID), and a bundle family manager identifier (SPB family custodian object ID), which enable to provide a service selected by the subscriber from among the bundles prepared in the server. In operation 6003, the bundle management server 650 may select one of a bundle having the transferred specific bundle identifier, a bundle having the bundle family identifier, and a bundle having the bundle family identifier and the bundle family manager identifier, and may transfer an identifier of the selected bundle to the service provider 640. The service provider 640 or the bundle providing server 650 may newly generate a bundle matching ID enabling identification of the selected bundle. The bundle providing server 650 may connect and manage the transferred SSP identifier (SSP ID) and the selected bundle. In operation 6003, the bundle management server 650 may transfer a bundle management server address (SPBM Addr) via which the selected bundle may be downloaded. The bundle management server address may be an address of itself, in which the prepared bundle is stored, or an address of another bundle management server, and may be an address of another bundle management server, via which download information (server address, etc.) of the prepared bundle may be stored and obtained.

Referring to FIG. 6, in operation 6005, the service provider 640 may transfer the prepared bundle download information to the subscriber 630. For the bundle download information, at least one of the bundle management server address (SPBM Addr), for which the bundle is prepared, the bundle matching ID of the prepared bundle, the bundle family identifier (SPB family ID) of the prepared bundle, and the bundle family manager identifier (SPB family custodian ID) may be selectively transferred.

Referring to FIG. 6, in operation 6006, the bundle download information may be transferred to the LBA 620 of the terminal 600. The bundle download information may be at least one of the address (SPBM Addr) of the bundle management server to which the LBA 620 is to access, a bundle identifier of the bundle prepared in operation 6003, the bundle family identifier (SPBM family ID) of the prepared bundle, and the bundle family manager identifier (SPB family custodian object ID). The bundle identifier may include at least one of a bundle event ID or the bundle matching ID generated in operation 6003. The bundle identifier may include at least one of the bundle family identifier and the bundle family manager identifier (SPB family custodian object ID) of the prepared bundle. The bundle event ID may include at least one of the address of the bundle management server and the bundle matching ID of the bundle prepared in operation 6003. The bundle download information may be input (e.g., QR code scanning, direct text input, etc.) to the LBA 620 by the subscriber 630 or may be input to the LBA 620 by using a push input via an information providing server (not illustrated). The LBA 620 may access the information providing server (not illustrated) configured for the terminal 600 in advance, so as to receive the bundle download information.

Figure 7:
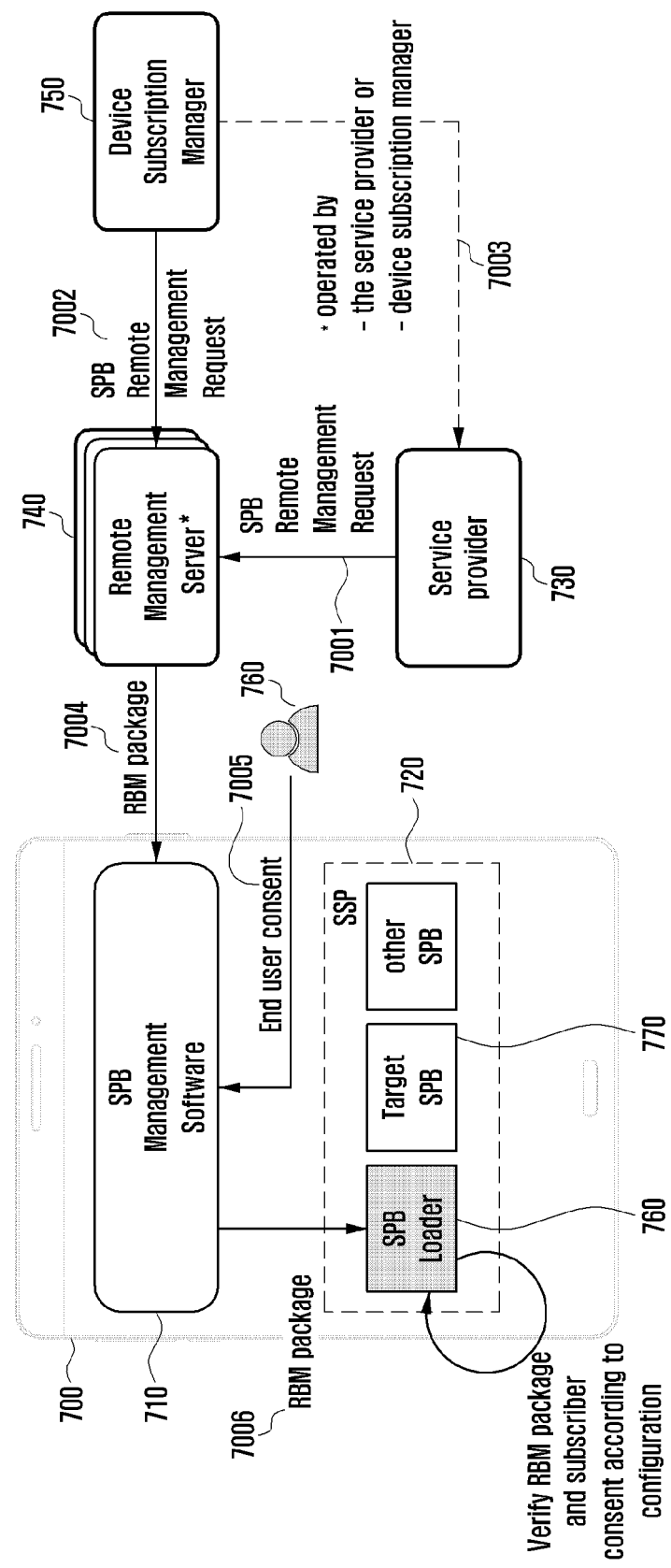
FIG. 7 illustrates a diagram of examples of a configuration of a terminal, and a method in which a service provider, a bundle management server, and a device manager interoperate according to some embodiments.

FIG. 7 illustrates a diagram of examples of a configuration of a terminal 700, and a method in which a service provider 730, a bundle management server 740, and a device manager (device subscription manager) 750 inter-operate according to some embodiments.

Referring to FIG. 7, the terminal 700 may include at least one bundle management software (or LBA) 710 and at least one SSP 720. The SSP 720 may include at least one SPBL 760 and a bundle 770.

In operation 7001, the service provider 730 may request remote bundle management from at least one bundle management server 740. The bundle management server 740 may be owned by a service provider 730 or may be operated by a third party via a contract. The remote management request may include at least one of new bundle installation, enabling, disabling, deleting of an installed bundle, and acquisition and modification of bundle information.

In operation 7002, the device manager 750 may request remote bundle management from the at least one bundle management server 740. The bundle management server 740 may be owned by the service provider 730 or the device manager 750, or may be operated by a third party via a contract.

The device manager 750 may request remote bundle management from the service provider 730 via operation 7003. According to the request, the service provider 730 may request remote bundle management from the at least one bundle management server 70 in operation 7001.

In operation 7004, the bundle management server 740 may transfer a remote management command to the bundle management software 710. The remote management command may be a remote management command generated by the bundle management server 740 with respect to at least one of a remote management request for a specific bundle, which is made in operations 7001, 7002, and 7003.

In operation 7005, the bundle management software 710 may identify at least one of a bundle configuration, a bundle management software configuration, an SPBL configuration, and a terminal configuration, which are indicated by the remote management command. If confirmation of a user 760 is required to perform the remote management command according to the confirmed configurations, the confirmation of the user 760 may be requested and received.

In operation 7006, the remote management command may be transferred to the SSP 720 via the bundle management software 710. In the disclosure, a bundle management operation by a service provider may be referred to as remote bundle management (remote SPB management).

In operation 7006, the SSP 720 or the SPBL 760 may check a bundle policy for processing the received remote bundle management command. The bundle policy may be stored in the bundle 770, the SPBL 760, or the bundle management software 710, and checking of the bundle policy may further include checking of the bundle management software 710 or the bundle management server 740. For a more detailed method of checking the bundle policy, reference will be made to the drawings to be described later.

Figure 8:
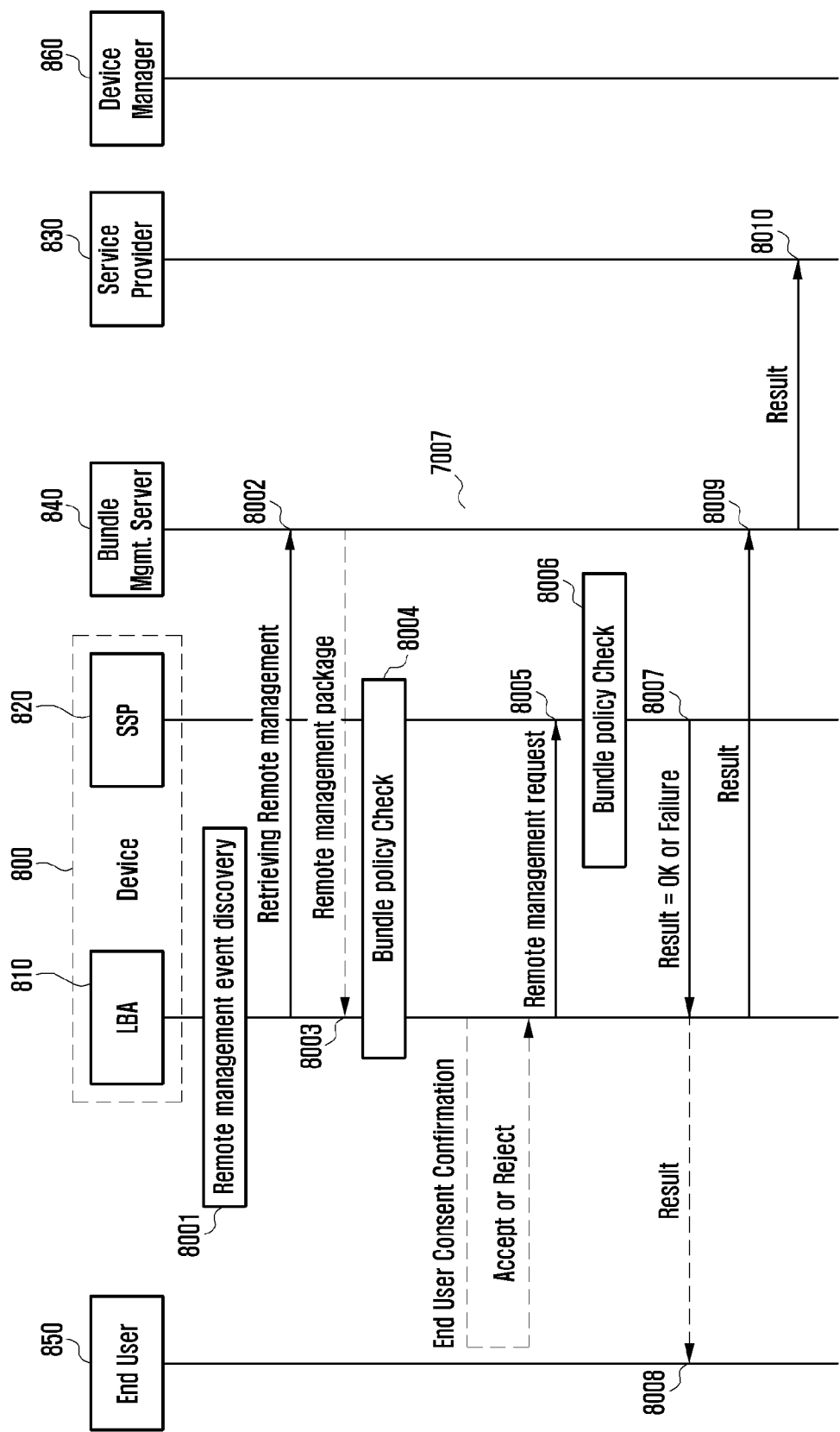
FIG. 8 illustrates a diagram of an example of a general procedure for performing remote bundle management by a terminal according to some embodiments.

FIG. 8 illustrates a diagram of an example of a general procedure for performing remote bundle management by a terminal 800 according to some embodiments.

In FIG. 8, for descriptions of configurations of the terminal 800, an LBA 810, an SSP 820, a service provider 830, a bundle management server 840, and a user 850, reference will be made to the descriptions of FIG. 7 respectively.

Referring to FIG. 8, in operation 8001, the LBA 810 may discover that a remote management command for the SSP 820 exists in the bundle management server 840. Operation 8001 may use a general user interface in which a user interacts with a terminal. For example, the user 850 may input a specific operation (QR code scanning, etc.) to the LBA 810 or may select a specific menu of the LBA 810. Operation 8001 may be input from the bundle management server 840, a third bundle management server (not illustrated), or a specific server (not illustrated).

Referring to FIG. 8, in operation 8002, the LBA 801 may request and download a remote bundle management command from the bundle management server 840. The LBA 810 may request information for requesting the remote bundle management command from the SSP 820 and may transfer the information to the bundle management server 840. In operation 8003, the bundle management server 840 may verify the information, and after the verification is successfully performed, the bundle management server 840 may transfer, to the LBA 810, the remote bundle management command in response to the request. The remote bundle management command may include at least one of an identifier of a bundle targeting bundle management, a bundle family identifier of the target bundle, a bundle family manager identifier of the target bundle, a bundle owner identifier of the target bundle, and a remote management command type.

In operation 8004, the LBA 810 may check a policy of the bundle targeting remote bundle management or a policy of the SSP 820. The LBA 810 may check the bundle policy of the target bundle stored in the terminal 800 by using the target bundle identifier configured for the remote bundle management command. The bundle policy may be stored in metadata of the bundle, and the metadata of the bundle may be stored in the LBA 810 or the SSP 820. If remote management requiring end user consent is performed according to the bundle policy, the LBA 810 may request user consent for the remote management command from the user. The bundle policy for remote bundle management may be configured for the LBA 810, and when performing remote management requiring end user consent according to the bundle policy configured for the LBA 810, the LBA 810 may request the user consent for the remote management command, from the user. If user consent is required for at least one of the bundle policy stored in the metadata of the bundle and the bundle policy configured for the LBA 810 with respect to the remote management command, the LBA 810 may request the user consent for the remote management command from the user. Operation 8004 may use a general user interface in which a user interacts with a terminal. When performing remote management requiring end user consent according to the bundle policy, the LBA 810 may perform operation 8005 after successfully performing user consent. When performing remote management that does not require user consent (end user consent) due to the bundle policy, the LBA 810 may perform operation 8005 without user consent.

In operation 8004, when end user consent is configured to be mandatory for at least one of the metadata of the bundle, the terminal 800, the LBA 810, and the SSP 820, the LBA 810 may perform operation 8005 after successfully performing user consent. The configuration may be performed, for example, in a case of a user terminal, such as a smartphone, that is required to perform user consent. If user consent is impossible, the LBA 810 may reject the remote management command.

If the remote bundle management server having transferred the remote bundle management command is required to be verified according to the bundle policy in operation 8004, the LBA 810 may selectively verify whether the bundle management server 840 corresponds to a bundle management server allowed for remote management command transfer according to the bundle policy. If the LBA 810 selectively performs the verification, the LBA 810 may perform operation 8005 after successfully performing verification of the remote bundle management server.

In operation 8005, the LBA 810 may request remote bundle management from the SSP 820. In operation 8006, the SSP 820 may check the bundle policy of the target bundle or the remote bundle management policy configured for the SSP 820, in order to perform remote bundle management. For example, in a case of remote bundle management for installation of the bundle, the SSP 820 may receive summary information (bundle metadata) of the bundle to be installed in the SSP 820 and/or a part of the bundle policy from the bundle management server 840 via the LBA 810. As another example, the SSP 820 may further receive all or a part of the bundle policy from the LBA 810 in addition to the bundle policy stored by itself. The SSP 820 may check the bundle policy of the target bundle, which is stored in the SSP 820 by using the target bundle identifier configured for the remote bundle management command. The detailed operation of the SSP 820 to check the bundle policy will be referred to the description of the drawings to be described later.

If the remote bundle management server having transferred the remote bundle management command is required to be verified according to the bundle policy, the SSP 820 may verify whether the bundle management server 840 corresponds to a bundle management server allowed for remote management command transfer according to the bundle policy. If the remote bundle management command is transferred from a bundle management server that is not allowed for remote management command transfer according to the bundle policy, the SSP 820 may terminate the remote bundle management. Even if remote bundle management is performed for a bundle for which remote management is not allowed according to the bundle policy, the SSP 820 may terminate the remote bundle management.

If the bundle policy requires verification of the remote bundle management server, the SSP 820 may use a verification key (credential) or a verification method stored in the bundle policy of the bundle designated by the transferred remote management command, in order to verify the bundle management server 840 having transferred the remote management command. For example, the bundle policy may store a public key that may be used to verify a digital signature, a digital certificate, a public key identifier (PKID) corresponding to the digital certificate or a public key of the digital certificate, a public key of a higher certificate that may verify the digital certificate, or a public key identifier corresponding to the public key of the higher certificate. The stored information may be information associated with a digital certificate for remote bundle management corresponding to a bundle, which is issued by the service provider 830 or a bundle owner to the bundle management server 840, wherein the bundle is of the service provider 830 or a bundle owner itself. The bundle policy may selectively include, in addition to the information, whether bundle management server verification is required. The SSP 820 may verify the digital signature included in the received remote bundle management command according to the configuration. If the remote bundle management command is transferred from a bundle management server for which unauthorized verification is not possible, the SSP 820 may terminate the remote bundle management.

In operation 8007, the SSP 820 may transfer a result of the remote management command to the LBA 810. In operation 8008, the LBA 810 may notify the result of performing the remote management command to the user via the user interface. The LBA 810 may notify the result of performing the remote management command to the bundle management server 840, and in operation 8010, the bundle management server 840 may notify the result of performing the remote bundle management to the service provider 830. The result notified in operation 8010 may include a part or all of the result of performing the remote bundle management, which is transferred from the LBA 810 in operation 8009.

Figure 9:
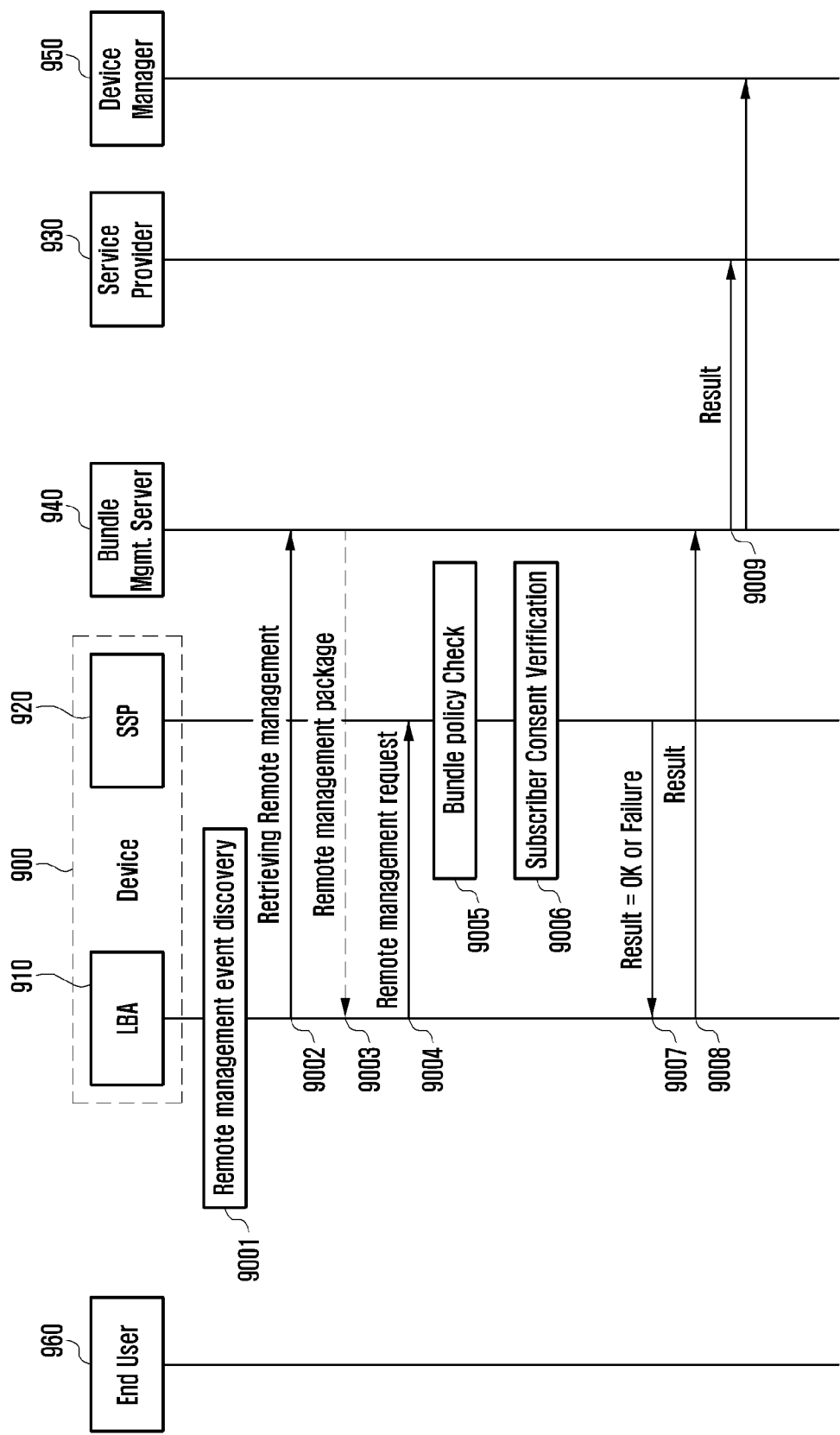
FIG. 9 illustrates a diagram of an example of a general procedure for performing remote bundle management by a terminal according to some embodiments.

FIG. 9 illustrates a diagram of an example of a general procedure for performing remote bundle management by a terminal 900 according to some embodiments.

In FIG. 9, for descriptions of configurations of the terminal 900, an LBA 910, an SSP 920, a service provider 930, a bundle management server 940, and a user 950, reference will be made to the descriptions of FIG. 7 respectively.

Referring to FIG. 9, in operation 9001, the LBA 910 may discover that a remote management command for the SSP 920 exists in the bundle management server 940. Operation 9001 may use a general user interface in which a user interacts with a terminal. For example, the user 950 may input a specific operation (QR code scanning, etc.) to the LBA 910 or may select a specific menu of the LBA 910. Operation 9001 may be input from the bundle management server 840, a third bundle management server (not illustrated), or a specific server (not illustrated) without involvement of the user 950.

Referring to FIG. 9, in operation 9002, the LBA 910 may request and download a remote bundle management command from the bundle management server 940. The LBA 910 may request information for requesting the remote bundle management command from the SSP 920 and may transfer the information to the bundle management server 940. In operation 9003, the bundle management server 940 may verify the information, and after the verification is successfully performed, the bundle management server 840 may transfer, to the LBA 910, the remote bundle management command in response to the request. The remote bundle management command may include at least one of an identifier of a bundle targeting bundle management, a bundle family identifier of the target bundle, a bundle family manager identifier of the target bundle, a bundle owner identifier of the target bundle, and a remote management command type.

In operation 9004, the LBA 910 may request remote bundle management from the SSP 920. In operation 9005, the SSP 920 may check the bundle policy of the target bundle or the remote bundle management policy configured for the SSP 920, in order to perform remote bundle management. For example, in a case of remote bundle management for installation of the bundle, the SSP 920 may receive summary information (bundle metadata) of the bundle to be installed in the SSP 920 and/or a part of the bundle policy from the bundle management server 940 via the LBA 910. As another example, the SSP 920 may further receive all or a part of the bundle policy from the LBA 910 in addition to the bundle policy stored by itself. As another example, the SSP 920 may preferentially apply the remote bundle management policy configured for the SSP 920 regardless of the summary information of the bundle. As another example, the SSP 920 may check the bundle policy of the target bundle, which is stored in the terminal 900 by using the target bundle identifier configured for the remote bundle management command. The detailed operation of the SSP 920 to check the bundle policy will be referred to the description of the drawings to be described later.

If the remote bundle management server having transferred the remote bundle management command is required to be verified according to the bundle policy, the SSP 920 may verify whether the bundle management server 940 corresponds to a bundle management server allowed for remote management command transfer according to the bundle policy. If the remote bundle management command is transferred from a bundle management server that is not allowed for remote management command transfer according to the bundle policy, the SSP 920 may terminate the remote bundle management. Even if remote bundle management is performed for a bundle for which remote management is not allowed according to the bundle policy, the SSP 920 may terminate the remote bundle management.

As a result of checking the bundle policy, if device manager or subscriber consent verification is required for remote management, the SSP 920 may identify a subscriber intention in operation 9006. In the disclosure, a subscriber may be a user or a group which purchases a bundle to use a specific service from the service provider 930, or may be a device manager (individual or group) who manages the terminal 900. Execution of operation 9006 may further include the terminal 900, the service provider 930, the device manager 950, and/or the bundle management server 940. Implementation of operation 9006 may utilize various other means provided by the terminal 900, the bundle management server 940, the service provider 930, and the device manager 950, such as checking a digital signature or certificate of the service provider 930 or the device manager 950 for any data (e.g., a remote management request message, an arbitrary string generated by the bundle management server 940 or the SSP 920, etc.), or identifying, by the device manager 950 or the service provider 930, a secret key (credential key) previously provided in the bundle installed in the terminal, the SSP 920, the LBA 910, and/or the bundle management server 940. A subscriber consent verification means required to be used in operation 9006 may be configured in the bundle policy, and if the means is not configured in the bundle policy, any means agreed/selected by the terminal 900, the bundle management server 940, the service provider 930, or the device manager 950 may be used. If, as a result of checking the bundle policy, subscriber consent verification is not required for the remote management, operation 9006 may be omitted. If the subscriber consent verification fails, the SSP 920 may terminate the remote management. If the subscriber consent verification is not required or if the subscriber consent verification is successful, the SSP 920 may perform remote management for the target bundle.

If the bundle policy requires verification of the remote bundle management server, the SSP 920 may use a verification key (credential) or a verification method stored in the bundle policy of the bundle designated by the transferred remote management command, in order to verify the bundle management server 940 having transferred the remote management command. For example, the bundle policy may store a public key that may be used to verify a digital signature, a digital certificate, a public key identifier (PKID) corresponding to the digital certificate or a public key of the digital certificate, a public key of a higher certificate that may verify the digital certificate, or a public key identifier corresponding to the public key of the higher certificate. The stored information may be information associated with a digital certificate for remote bundle management of a bundle, which is issued by the service provider 930 or a bundle owner to the bundle management server 940, wherein the bundle is of the service provider 930 or a bundle owner itself. The bundle policy may selectively include, in addition to the information, whether bundle management server verification is required. The SSP 920 may verify the digital signature included in the received remote bundle management command according to the configuration. If the remote bundle management command is transferred from a bundle management server for which unauthorized verification is not possible, the SSP 920 may terminate the remote bundle management.

If the remote bundle management server having transferred the remote bundle management command is required to be verified according to the bundle policy, the SSP 920 may verify whether the bundle management server 940 corresponds to a bundle management server allowed for remote management command transfer according to the bundle policy. If the remote bundle management command is transferred from a bundle management server that is not allowed, the SSP 920 may terminate the remote bundle management. Even if remote bundle management is performed for a bundle for which remote management is not allowed according to the bundle policy, the SSP 920 may terminate the remote bundle management. In operation 9007, the SSP 920 may transfer a result of the remote management command to the LBA 910. In operation 9008, the LBA 910 may notify the result of performing the remote management command to the bundle management server 940, and in operation 9009, the bundle management server 940 may notify the result of performing the remote bundle management to the service provider 930 or the device manager 950. The result notified in operation 9009 may include a part or all of the result of performing the remote bundle management, which is transferred from the LBA 910 in operation 9008.

FIG. 10 illustrates a diagram of an example of configuring a bundle policy according to some embodiments.

Referring to FIG. 10, a bundle policy 1010 may be expressed as a series of parameters. The bundle policy 1010 of FIG. 10 is expressed in a form of a table for the convenience of description, but does not necessarily have a table format, and may be configured by listing of parameters. It should be noted that configuration values of respective parameters illustrated in FIG. 10 are merely expressing an example of a bundle policy for the convenience of description, and actual configuration values may be different for each bundle.

The bundle policy 1010 may include a type of local management or remote management command ("command" list) 1011 received by each bundle. Each remote management command may be expressed as a string or a digit string indicating a corresponding command. In FIG. 10, local management or remote management commands are configured to express five of "install", "enable", "disable", "delete", and "update metadata". However, types of local management or remote management commands that may be included in the command type 1011 are not limited thereto, and may be extended to various other bundle management commands. In FIG. 10, the local management or remote management commands are separately expressed, but one or more local management or remote management commands may be grouped together. For example, it is possible to divide commands into two types, such as "install" and "others (or etc.)" so as to separately express a command corresponding to bundle installation and a command corresponding to others, and it is also possible to express all commands in one type, such as "all commands (all)", without classifying types of commands.

The bundle policy 1010 may include a "local management" configuration 1012 indicating detailed configurations for local management of a corresponding command according to the classification of the command type 1011.

More specifically, the local management configuration 1012 may further include an indicator ("allowed" indicator) 1012a indicating whether each local management command is allowed. If a local management command of a bundle is allowed, the indicator 1012a may be expressed as a string, a digit string, or a logic symbol (Boolean) indicating "Yes". If a local management command of a bundle is not allowed, the indicator 1012a may be expressed as a string, a digit string, or a logic symbol (Boolean) indicating "No".

The local management configuration 1012 may further include an indicator ("end user consent" indicator), 1012b indicating whether execution of each local management command necessarily requires end user consent. If a local management command of a bundle is required to be initiated by an end user, the indicator 1012b may be expressed as a string, a digit string, and/or a logic symbol (Boolean) indicating "required". If a local management command of a bundle is not required to be initiated by a user, and if the terminal may initiate the command by itself, the indicator 1012b may be expressed as a string, a digit string, and/or a logic symbol (Boolean) indicating "not required". If a local management command of a bundle is not allowed according to the configuration of the indicator 1012a that allows the local management command, the indicator 1012b may be expressed as a string, a digit string, and/or a logic symbol (Boolean) indicating "not applicable (N/A)".

The bundle policy 1010 may include a "remote management" configuration 1013 indicating detailed configurations for remote management of a corresponding command according to the classification of the command type 1011.

More specifically, the remote management configuration 1013 may further include an indicator ("allowed" indicator)

1013a indicating whether each remote management command is allowed. If a remote management command of a bundle is allowed, the indicator 1013a may be expressed as a string, a digit string, or a logic symbol (Boolean) indicating "Yes". If a remote management command of a bundle is not allowed, the indicator 1013a may be expressed as a string, a digit string, or a logic symbol (Boolean) indicating "No".

The remote management configuration 1013 may further include an indicator ("end user consent" indicator), 1013b indicating whether execution of each remote management command necessarily requires end user consent. If a remote management command of a bundle necessarily requires user consent, the indicator 1013b may be expressed as a string, a digit string, or a logic symbol (Boolean) indicating "required", and therefore a means of verifying a user intention may be indicated in more detail if necessary. If user consent is described as "required", but a verification means is not specified, or the terminal is unable to use the indicated means for user consent verification, the terminal may select any one of available verification means. If a remote management command of a bundle does not require user consent, the indicator 1013b may be expressed as a string, a digit string, and/or a logic symbol (Boolean) indicating "not required". If a remote management command of a bundle is not allowed according to the configuration of the indicator 1013a that allows the remote management command, the indicator 1013b may be expressed as a string, a digit string, and/or a logic symbol (Boolean) indicating "not applicable (N/A)".

The remote management configuration 1013 may selectively further include an indicator ("SPBM verification" indicator) 1013c indicating whether execution of each remote management command necessarily requires information verification (SPBM verification) of the bundle management server having transferred the remote management command. The indicator may selectively further include a series of methods capable of verifying information of the bundle management server or a verification key (credential) that may be used for the verification method. If the verification means is not specified, it may indicate that no verification is required. If it is necessary to check the information of the bundle management server having transferred the remote management command so as to execute the remote management command of the bundle, the indicator 1013c may be expressed as a string and/or a digit string indicating an identifier of the bundle management server, and may include identifiers of multiple bundle management servers if necessary. The bundle management server identifier may be referred to as data including at least one of addresses (FQDN, IP addresses, or URL) of the bundle management servers or object identifiers (OID) of the respective servers. A bundle management server identifier may not be included according to the command type 1011, and a different bundle management server identifier may be included according to the command type 1011. If it is necessary to verify a digital signature using a digital certificate designated by a service provider or a bundle owner so as to verify the bundle management server having transferred the remote management command to execute the remote management command of the bundle, the indicator 1013c may store a public key which may be used to verify the digital signature designated by the service provider or the bundle owner, a digital certificate, a public key identifier (PKID) corresponding to the digital certificate or the public key of the digital certificate, a public key of a higher certificate enabling verification of the digital certificate, or a public key identifier corresponding to the public key of the higher certificate. The indicator 1013c may include a shared secret key (shared secret, password, symmetric key, etc.) designated by the service provider or the bundle owner. The indicator 1013c may include multiple verification methods.

The remote management configuration 1013 may further include an indicator ("subscriber consent verification" indicator) 1013d indicating whether execution of each remote management command necessarily requires subscriber consent verification. If subscriber consent verification is required to execute a remote management command of a bundle, the indicator 1013d may be expressed as a string, a digit string, or a logic symbol (Boolean) indicating "required", and therefore a means of subscriber consent verification may be indicated in more detail if necessary. Various other verification means may be used, for example, verifying security information, such as a subscriber's secret key ("credential key" of 1013d), or verifying a digital signature of the subscriber using a digital certificate ("signed token" of 1013d). If subscriber consent verification is described as "required" but the verification means is not specified, or the terminal and/or the bundle management server is unable to use the indicated subscriber consent verification means, the terminal and/or the bundle management server may select any one of available verification means. If subscriber consent verification is not required to execute a remote management commend of a bundle, the indicator 1013d may be expressed as a string, a digit string, and/or a logic symbol (Boolean) indicating "not required". If a remote management command of a bundle is not allowed according to the configuration of the indicator 1013a that allows the remote management command, the indicator 1013d may be expressed as a string, a digit string, and/or a logic symbol (Boolean) indicating "not applicable (N/A)".

The remote management configuration 1013 may selectively further include an indicator ("SPBM owner verification" indicator) 1013e indicating whether execution of each remote management command necessarily requires verification of a subject having requested the remote management command. If it is necessary to verify a subject having requested a remote management command of a bundle so as to execute the remote management command, the indicator 1013e may be expressed as a string and/or a digit string indicating an identifier of the bundle owner or a manager, and may include identifiers of multiple bundle owners or managers if necessary. The bundle owner identifier or the bundle manager identifier may be an object identifier (OID) of the service provider or the device manager, and may be referred to as data including at least one or more object identifiers. A bundle owner identifier or a bundle manager identifier may not be included according to the command type 1011, and a different bundle owner identifier or bundle manager identifier may be included according to the command type 1011.

FIG. 11 illustrates a diagram of an example of configuring SSP remote management for remote bundle management according to some embodiments.

Referring to FIG. 11, an SSP remote management configuration 1110 may be expressed as a series of parameters. The bundle policy 1110 of FIG. 11 is expressed in a form of a table for the convenience of description, but does not necessarily have a table format, and may be configured by listing of parameters. It should be noted that configuration values of respective parameters illustrated in FIG. 11 are merely expressing an example of an SSP remote management configuration for the convenience of description, and actual configuration values may be different.

The SSP remote management configuration 1110 may include 1120 an identifier indicating classification of a bundle installed or to be installed in an SSP. Identifiers indicating classification of the bundle installed or to be installed in each SSP may include one of a bundle family identifier, a bundle family manager identifier, a bundle owner identifier, or a device manager identifier of the bundle, and may appear in various combinations of the above-listed identifiers. In FIG. 11, the SSP remote management configuration is expressed as a combination of a bundle family identifier, a bundle family manager identifier, and a bundle owner identifier, but may be expressed as a combination of various values that can be configured for other bundles, bundle metadata, and remote bundle management commands. For example, the SSP remote management configuration may be expressed as a combination 1120*a* of a bundle family identifier, a bundle family manager identifier, and a bundle owner identifier, and this may refer to an SSP remote management configuration applied to a bundle in which a specific bundle family identifier, a specific bundle family manager identifier, and a specific bundle owner identifier are configured. The SSP remote management configuration may be expressed as a combination 1120*b* of a bundle family identifier and a bundle family manager identifier, and this may refer to an SSP remote management configuration applied to a bundle in which a specific bundle family identifier and a bundle family manager identifier are configured, and may be a configuration applied regardless of a bundle owner identifier. The SSP remote management configuration may be expressed 1120*c* only with a bundle family identifier, and this may refer to an SSP remote management configuration applied to a bundle in which a specific bundle family identifier is configuration, and may be a configuration applied regardless of a bundle family manager identifier and a bundle owner identifier. The SSP remote management configuration may be "all identifier combination (all)" 1120*d*, and may refer to all bundles regardless of identifiers configured for the bundles. The SSP remote management configuration may be a configuration that additionally includes a specific remote bundle management command.

If execution of each remote management command necessarily requires subscriber consent verification, the SSP remote management configuration 1110 may indicate a means capable of verifying a subscriber intention ("subscriber intent verification method" indicator) 1130. For example, if the received remote bundle management command includes a digital signature of a subscriber, the means 1130 for verifying the subscriber's intention may include a public key that may be used to verify the digital signature, a digital certificate or a public key identifier corresponding to a public key of the digital certificate, and a public key identifier (PKID) corresponding to a public key of a higher certificate that may verify the digital certificate. Security information, such as a secret key of the subscriber, and various other verification means may be specified. If a means of subscriber consent verification is not specified, or a terminal and/or a bundle management server is unable to use an indicated subscriber consent verification means, the terminal and/or the bundle management server may select any one of available verification means. If the verification means is not specified, it may indicate that no verification is required.

Figure 12:
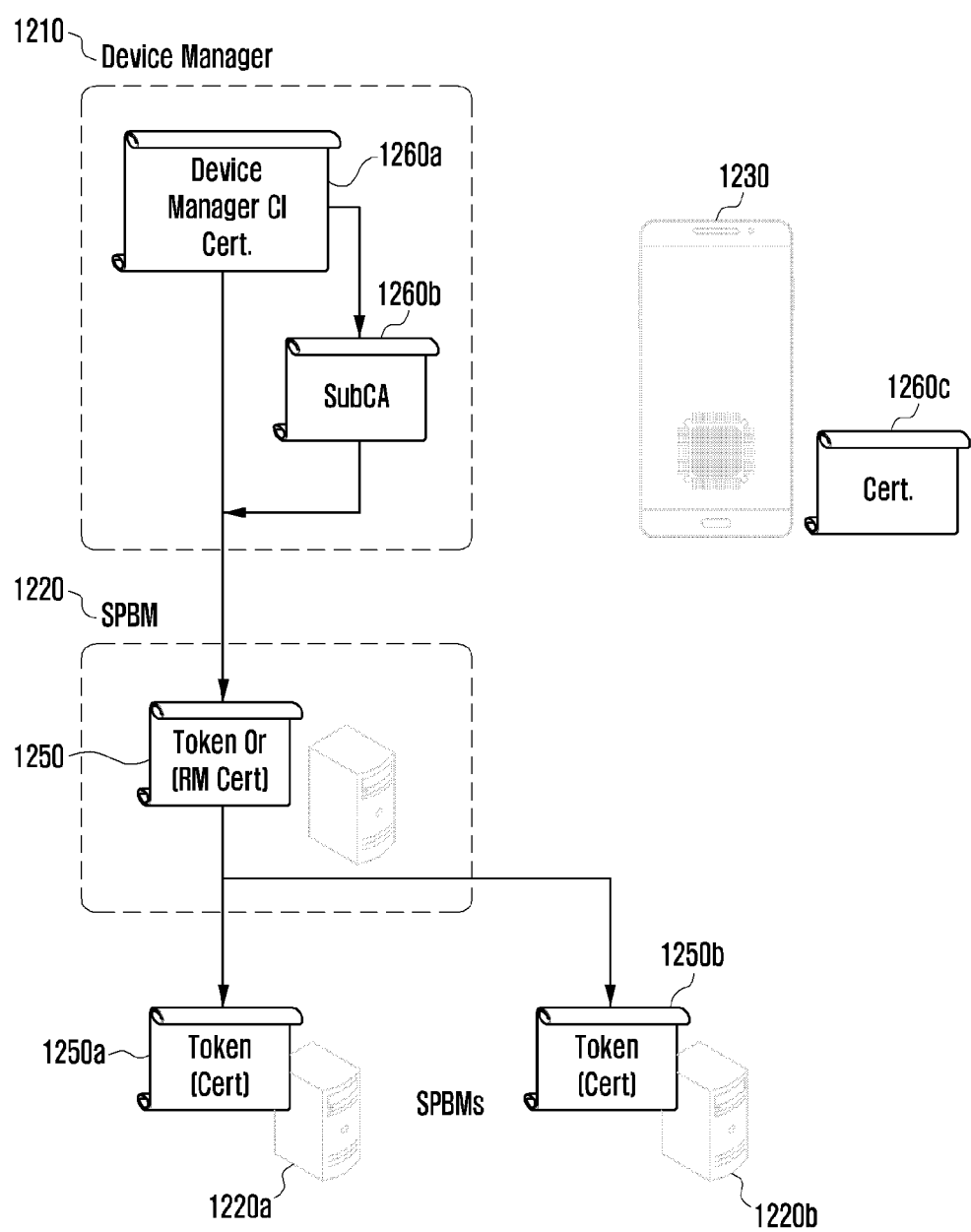
FIG. 12 illustrates a diagram of an example of a procedure for configuring SSP remote management authority between a device manager, a service provider, and a bundle management server, and between the device manager and an SSP according to some embodiments.

FIG. 12 illustrates a diagram of an example of a procedure for configuring SSP remote management authority between a device manager, a service provider, and a bundle management server, and between the device manager and an SSP according to some embodiments;

Referring to FIG. 12, a device manager 1210 may issue a remote bundle management token 1250 in order to give, to a bundle management server 1220, an authority to generate and transfer a remote bundle management command for a bundle installed or to be installed in a terminal 1230 managed by the device manager 1210 itself. The remote bundle management token 1250 may be in a form of a digital certificate proving to have a remote bundle management authority, and may include a public key paired with a specific secret key held by the bundle management server 1220. The remote bundle management token 1250 may selectively include at least one of the following value, based on which the bundle management server 1220 may designate a remotely manageable bundle among bundles installed or to be installed in the terminal 1230 managed by the device manager 1210 itself.

Bundle manageable period or remote bundle management token validity period
Identifier of an SSP or a terminal, in which a bundle has been installed or is to be installed
Bundle identifier
Bundle family identifier
Bundle family manager identifier
Bundle owner identifier
Device manager identifier
Remote bundle management command allowed to a bundle management server
Whether it is possible to issue a new remote bundle management token The remote bundle management token 1250 may further include a digital signature of the device manager, which is generated with a secret key used by the device manager 1210 when issuing the remote bundle management token 1250. The device manager 1210 may own digital certificates 1260*a* and 1260*b* including a public key paired with the private key. The digital certificate 1260*b* may be issued using a private key paired with a higher digital certificate 1260*a*.

The bundle management server 1220 may issue, to other bundle management servers 1220*a* and 1220*b*, other remote bundle management tokens 1250*a* and 1250*b* by using a secret key paired with the remote bundle management token 1250 issued from the device manager 1210. If the remote bundle management token 1250 is configured so that a new token cannot be issued, the bundle management server 1220 may not be able to issue a remote bundle management token. The digital certificates 1250*a* and 1250*b* may selectively include at least one of values, based on which the bundle management servers 1220*a* and 1220*b* may designate remotely manageable bundles, and the values may be the same as values designated to the remote bundle management token 1250 by the device manager 1210 or may include some of the designated values, and the two values may be different from each other.

Referring to FIG. 12, the terminal 1230 may be storing a digital certificate or a public key 1260*c* capable of verifying the remote bundle management token 1250 issued by the device manager 1210 and the remote bundle management tokens 1250*a* and 1250*b* issued by the bundle management server 1220. The digital certificate or public key 1260*c* may be the same as the digital certificates 1260*a* and 1260*c* of the device manager 1210, and may be the same as public keys included in the digital certificates. The digital certificate or public key 1260*c* may be one of the means capable of verifying a subscriber intention, described in FIG. 11.

Figure 13:
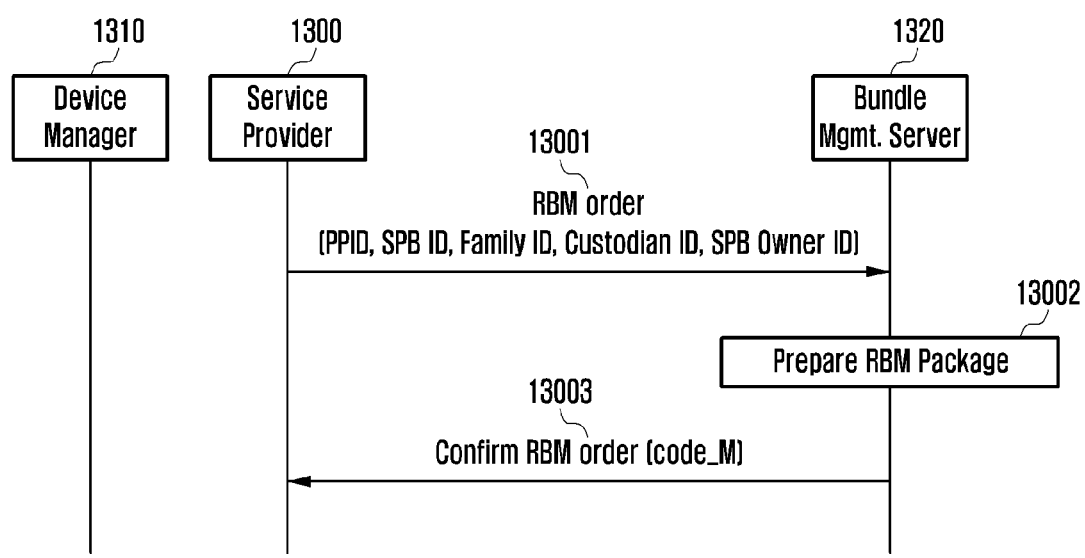
FIG. 13 illustrates a diagram of an example of a procedure for generating a remote bundle management command by a bundle management server according to some embodiments.

FIG. 13 illustrates a diagram of an example of a procedure for generating a remote bundle management command by a bundle management server according to some embodiments.

Referring to FIG. 13, in operation 13001, a service provider 1300 or a device manager 1310 may request a bundle management server 1320 to generate a remote bundle management command. In operation 13001, the service provider 1300 or the device manager 1310 may request generation of a remote bundle management command including at least one of the following request values.

Target terminal or SSP identifier
Target bundle identifier
Bundle family identifier of a target bundle
Bundle family manager identifier of a target bundle
Bundle owner identifier of a target bundle
Remote management commands (e.g., install, enable, disable, delete, etc.)

Referring to FIG. 13, in operation 13002, the bundle management server 1320 may selectively determine whether the device manager 1310 or the service provider 1300 having requested a remote bundle management command has an authority to request a remote bundle management command of a corresponding bundle. The bundle management server 1320 may select at least one of the request values transferred by the device manager 1310 or the service provider 1300 having requested the remote bundle management command in operation 13001, and if the selected request value does not match a value configured for the bundle management server 1320, the bundle management server 1320 may reject generation of the remote bundle management command. For example, the generation of the remote bundle management command may be rejected in a case where a requested bundle owner identifier of a target bundle does not match the device manager 1310 or the service provider 1300, the device manager 1310 or the service provider 1300 does not have a request authority for the requested remote management command, the bundle management server 1320 does not have an authority to generate a specific remote bundle management command for the requested target bundle, or at least one of target bundle information (e.g., at least one of the target terminal or SSP identifier, the target bundle identifier, the bundle family identifier of the target bundle, the bundle family manager identifier of the target bundle, and the bundle owner identifier of the target bundle) and requested command information does not match.

The bundle management server 1320 may selectively check configurations for the bundle targeted by the requested remote bundle management command, and may generate a remote bundle management command. The remote bundle management command may include at least one of the following values.

Target bundle identifier
Bundle family identifier of a target bundle
Bundle family manager identifier of a target bundle
Bundle owner identifier of a target bundle
Remote management commands (e.g., install, enable, disable, delete, etc.)

If the bundle is configured to require subscriber consent verification for the remote bundle management command, the bundle management server may digitally sign the remote bundle management command by using a secret key. The used secret key may be a secret key paired with a remote bundle management token issued by the device manager 1210 in FIG. 12, which matches the configuration of the target bundle. When selecting the secret key for generation of the digital signature, the selection may be made for a secret key paired with a remote bundle management token in which at least one configuration value for the bundle matches with at least one among an identifier of an SSP or a terminal, in which the bundle has been installed or is to be installed, a bundle identifier, a bundle family identifier, a bundle family manager identifier, a bundle owner identifier, a device manager identifier, and a remote bundle management command allowed to the bundle management server, in information configured for the remote bundle management token. In addition to the digital signature, the subscriber consent verification value may be a verification value generated using a shared secret key previously shared with the bundle management server and the target bundle or target SSP.

If the configuration for the bundle includes a verification key (credential) or a verification method specified by the service provider or the bundle owner with respect to the remote bundle management command, the bundle management server may add information verifiable with the verification key to the remote bundle management command. For example, the service provider or the bundle owner may perform digital signing with a secret key paired with a corresponding certificate so that verification is possible using the digital certificate included in a bundle policy. Information verifiable using a shared secret key (shared secret, password, symmetric key, etc.) designated by the service provider or the bundle owner may be included.

In operation 13002, if it is allowed to generate digital signatures with the same secret key for multiple remote bundle management commands, the bundle management server 1320 may generate one digital signature including the multiple remote bundle management commands.

If the remote bundle management command is successfully generated in operation 13002, the bundle management server 1320 may generate an identifier CodeM of the remote bundle management command and may store the same in connection with the target SSP identifier and the remote bundle management command.

In operation 13003, the bundle management server 1320 may transfer a remote bundle management command generation result (success or failure) to the service provider 1300 or the device manager 1310. If the generation of the remote bundle management command is successful, the bundle management server 1320 may selectively include and transfer the identifier of the remote bundle management command.

Figure 14:
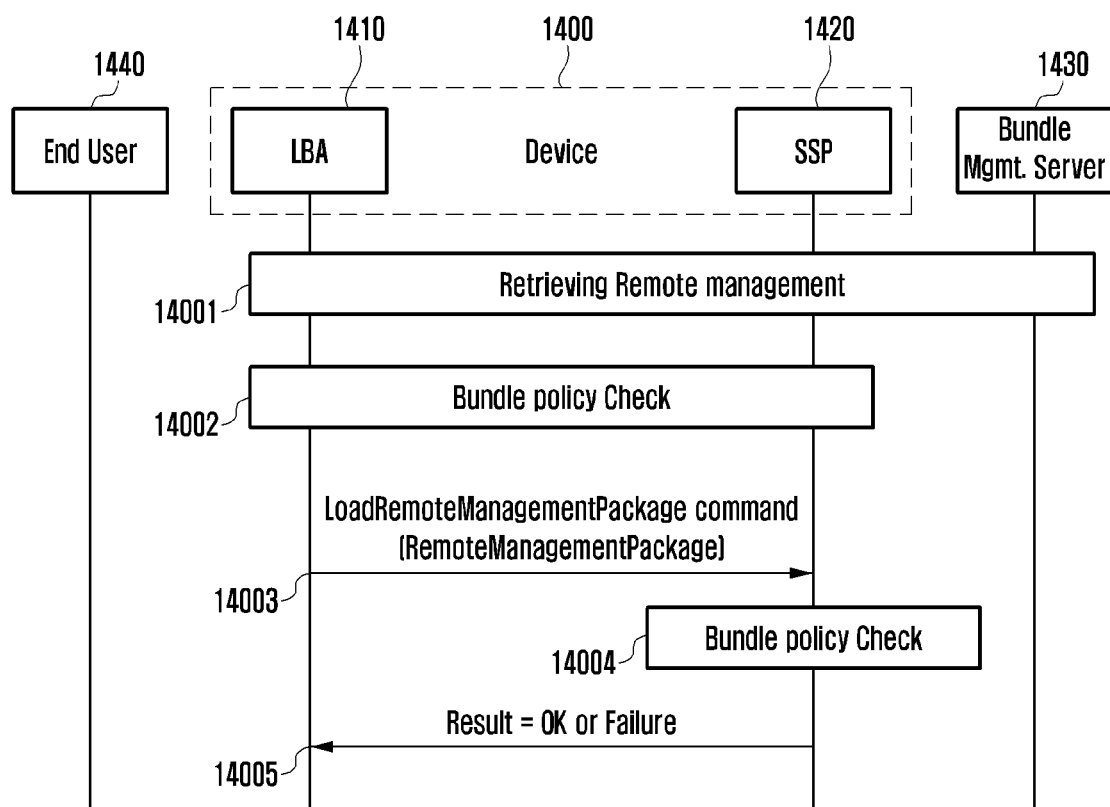
FIG. 14 illustrates a diagram of an example of a procedure in which a terminal verifies and executes a remote bundle management command received from a bundle management server according to some embodiments.

FIG. 14 illustrates a diagram of an example of a procedure in which a terminal verifies and executes a remote bundle management command received from a bundle management server according to some embodiments.

Referring to FIG. 14, in operation 14001, a terminal 1400 may request a remote bundle management command from a bundle management server 1430, or may receive the remote bundle management command. For the reception, an LBA 1410 of the terminal 1400 may receive the remote bundle management command by using information of an SSP 1420. When the remote bundle management command is transferred to LBA 1410, the bundle management server 1430 may transfer, together with the remote bundle management command, a digital certificate that may be used to verify a digital signature for subscriber consent verification, which is included in the remote bundle management command, or a higher certificate of the corresponding certificate. The digital certificate may be a remote bundle management token issued by a device manager to the bundle management server. A digital certificate that may be used to verify a signature for bundle management server verification, which is included in the remote bundle management command, or a higher certificate of the corresponding certificate may be selectively transferred. The remote bundle management command may include at least one of an identifier of a bundle targeting bundle management, a bundle family identifier of the target bundle, a bundle family manager identifier of the target bundle, a bundle owner identifier of the target bundle, and a remote management command type.

In operation 14002, the LBA 1410 may check information configured for the received remote bundle management command. The LBA 1410 may compare a policy of the target bundle, which is stored in the terminal 1400, with at least one among the target bundle identifier, the bundle family identifier of the target bundle, the bundle family manager identifier of the target bundle, the bundle owner identifier of the target bundle, and the remote management command type, in information configured for the remote bundle management command. The bundle policy may be stored in metadata of the bundle, the SSP 1420, the LBA 1410, or the terminal 1400, and a priority for application may vary depending on implementation. In operation 14002, the LBA 1410 may perform user consent if the user consent is necessary before execution of the remote bundle management command in the compared bundle policy.

In operation 14003, the LBA 1410 may transfer the remote bundle management command to the SSP 1420. The LBA 1420 may transfer a part or all of the remote bundle management command received from the bundle management server 1430 in operation 14001. The transferred remote bundle management command may be a command for remote management (enable, disable, delete, information request, etc.) of a previously installed bundle or an installation command for a new bundle. A digital certificate that may be used to verify a digital signature for subscriber consent verification, which is included in the remote bundle management command, and a higher certificate of the corresponding certificate may be transferred together. A digital certificate that may be used to verify a signature for bundle management server verification, which is included in the remote bundle management command, or a higher certificate of the corresponding certificate may be selectively transferred.

In operation 14004, the SSP 1420 may check the policy of the target bundle. The SSP 1420 may compare the policy of the target bundle, which is stored in the terminal 1400, with at least one among the target bundle identifier, the bundle family identifier of the target bundle, the bundle family manager identifier of the target bundle, the bundle owner identifier of the target bundle, and the remote management command type, in the information configured for the remote bundle management command. The bundle policy may refer to the remote management configuration in descriptions provided in FIG. 10. The bundle policy may be configured for the SSP 1420 instead of bundle metadata.

In operation 14004, if subscriber consent verification is configured to be mandatory in execution of the remote bundle management command, the SSP 1420 may verify a subscriber consent verification value included in the remote bundle management command transferred from the LBA 1410. The configuration may be checked via the bundle policy configured for the bundle metadata or a self-bundle policy configured for the SSP 1420.

When the digital signature included in the remote bundle management command is verified in operation 14004, the SSP 1420 may, as shown in FIG. 11, check an SSP remote management configuration and may select a subscriber consent verification means necessary for verification configured for the target bundle. The subscriber consent verification means may be configured for the bundle policy in the metadata of the bundle, and the SSP may select this.

For example, in order to verify a subscriber's digital signature for the received remote bundle management command, the SSP 1420 may select a public key that may be used to verify the digital signature, a digital certificate or a public key identifier corresponding to a public key of the digital certificate, and a public key identifier (PKID) corresponding to a public key of a higher certificate that may verify the digital certificate. Based on the subscriber consent verification value, security information, such as a secret key of the subscriber, and various other verification means may be selected. For the verification means, an SSP remote management configuration or a bundle policy matching at least one among the bundle identifier, the bundle family identifier, the bundle family manager identifier, and the bundle owner/device manager identifier of the target bundle may be selected. If the verification means is not specified, it may indicate that no verification is required.

When the digital signature is verified, the SSP 1420 may verify a digital certificate and a higher certificate thereof, wherein the digital certificate may be used to verify the digital signature for subscriber consent verification transferred with the remote bundle management command. Verification of the digital certificate being valid may further include verifying that at least one among a validity period, the bundle identifier, the bundle family identifier, the bundle family manager identifier, the bundle owner/device manager identifier, and the allowed remote bundle management command, which are included in the digital certificate, matches with the policy of the target bundle and the SSP remote management configuration.

If the subscriber consent verification is successful, the SSP 1420 may execute the remote bundle management command. If the verification fails, the SSP 1420 may reject execution of the remote bundle management command.

In operation 14004, when the remote bundle management command is executed, if information verification (SPBM verification) of the bundle management server having transferred the remote management command is configured to be mandatory, the SSP 1420 may verify a bundle management server check verification value included in the remote bundle management command transferred from the LBA 1410. The configuration may be checked via the bundle policy configured for the bundle metadata or the self-bundle policy configured for the SSP 1420.

When the digital signature included in the remote bundle management command is verified in operation 14004, the SSP 1420 may, as shown in FIG. 10, check the bundle policy of the target bundle and may select a verification means required for verification, which is configured for the bundle policy.

For example, the received remote bundle management command includes the digital signature of the bundle management server, and in order to verify this, the SSP 1420 may select a public key that may be used to verify the digital signature according to the bundle policy of the target bundle, a digital certificate or a public identifier corresponding to a public key of the digital certificate, and a public key identifier (PKID) corresponding to a public key of a higher certificate that may verify the digital certificate. Based on the bundle management server check verification value, security information, such as a secret key, and various other verification means may be selected. If the verification means is not specified, it may indicate that no verification is required.

If the bundle management server successfully verifies the information, the SSP 1420 may execute the remote bundle management command. If the verification fails, the SSP 1420 may reject execution of the remote bundle management command.

The SSP 1420 may determine whether the bundle policy of the bundle targeted by the remote bundle management command is configured to verify at least one of end user consent or subscriber consent verification. If the bundle policy is configured not to verify both end user consent and subscriber consent verification, the SSP 1420 may reject the execution of the remote management command. If the bundle policy is configured to verify end user consent or subscriber consent verification, the SSP 1420 or the LBA 1410 may perform the configured consent verification and, if the verification is successful, the remote bundle management command may be executed.

In operation 14005, the SSP 1420 may transfer an execution result of the remote bundle management command to the LBA 1410.

Figure 15:
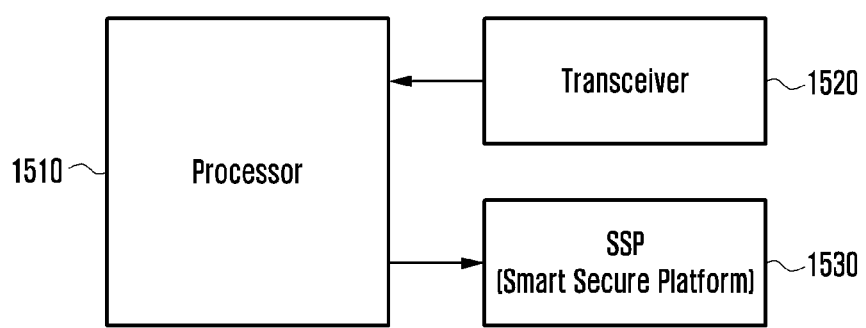
FIG. 15 illustrates a diagram of a configuration of a terminal according to some embodiments.

FIG. 15 illustrates a diagram of a configuration of a terminal according to some embodiments.

As illustrated in FIG. 15, a terminal may include a transceiver 1510 and at least one processor 1520. The terminal may include an SSP 1530. For example, the SSP 1530 may be inserted into the terminal or may be embedded in the terminal. The at least one processor 1520 may be referred to as a controller.

However, the configuration of the terminal is not limited to FIG. 15, and may include more or fewer elements than the elements illustrated in FIG. 15. According to some embodiments, the transceiver 1510, at least one processor 1520, and a memory (not illustrated) may be implemented in a form of a single chip. When the SSP 1530 is embedded, the configuration of the terminal may be implemented in the form of a single chip including the SSP 1530. According to some embodiments, the transceiver 1510 may transmit and receive signals, information, data, and the like according to various embodiments to and from a bundle management server. The transceiver 1510 may include an RF transmitter that up-converts and amplifies a frequency of a transmitted signal, an RF receiver that amplifies a received signal with low noise and down-converts a frequency, and the like. However, this is merely an embodiment of the transceiver 1510, and the elements of the transceiver 1510 are not limited to the RF transmitter and the RF receiver. The transceiver 1510 may receive a signal via a wireless channel, may output the same to at least one processor 1520, and may transmit the signal output from at least one processor 1520, via the wireless channel.

According to some embodiments, the transceiver 1510 may receive a certificate of a bundle management server, CI information to be used by the SSP 1530, a bundle family identifier, a bound bundle, and the like from the bundle management server. The transceiver 1510 may transmit CI information corresponding to a specific bundle family identifier, authentication information of the SSP 1530, and the like to the bundle management server.

At least one processor 1520 is an element for overall control of the terminal. The at least one processor 1520 may control overall operations of the terminal according to various embodiments as described above.

The SSP 1530 may include a processor or controller for installing and controlling a bundle, or an application may be installed.

According to some embodiments, at least one processor or controller within the SSP 1530 may check certificate issuer (CI) information that may be used when a specific bundle corresponding to a specific bundle family identifier is downloaded and installed, and may verify at least one among a transferred bundle management server certificate, CI information to be used by the SSP, and a bundle family identifier, on the basis of CI information for each bundle family identifier pre-configured for the SSP 1530.

According to some embodiments, at least one processor 1520 may control the transceiver 1510 to transfer CI information corresponding to a specific bundle family identifier to the bundle management server, and may receive at least one among a certificate of the bundle management server, CI information to be used by the smart secure platform (SSP), and the bundle family identifier from the bundle management server.

The SSP 1530 according to various embodiments may download a bundle and install the bundle. The SSP 1530 may manage the bundle.

According to some embodiments, the SSP 1530 may operate under a control of the processor 1520. Alternatively, the SSP 1530 may include a processor or controller for installing and controlling a bundle, or may have an application installed therein. Some or all of applications may be installed in the SSP 1530 or a memory (not illustrated).

The terminal may further include a memory (not illustrated), and may store data, such as a default program, an application program, and configuration information for operations of the terminal. The memory may include at least one storage medium from among a flash memory type, a hard disk type, a multimedia card micro type, a card type memory (e.g., SD or XD memory, etc.), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM). The processor 1520 may perform various operations by using various programs, contents, data, etc. stored in the memory.

Figure 16:
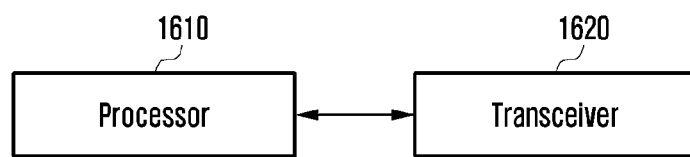
FIG. 16 illustrates a diagram of a configuration of a bundle management server according to some embodiments.

FIG. 16 illustrates a diagram of a configuration of a bundle management server according to some embodiments.

According to some embodiments, a bundle management server may include a transceiver 1610 and at least one processor 1620. The configuration of the bundle management server is not limited to FIG. 16, and may include more or fewer elements than the elements illustrated in FIG. 16. According to some embodiments, the transceiver 1610, at least one processor 1620, and a memory (not illustrated) may be implemented in a form of a single chip.

According to some embodiments, the transceiver 1610 may transmit and receive signals, information, data, and the like according to various embodiments to and from a terminal, a subscriber, or a service provider. For example, the transceiver 1610 may receive SSP authentication information, certificate information corresponding to a bundle family manager identifier and a bundle family identifier or a specific bundle family identifier, etc. from the terminal, and may transmit a certificate of the bundle management server, certificate information to be used by the SSP, the bundle family identifier, a bound bundle, etc. to the terminal.

The transceiver 1610 may include an RF transmitter that up-converts and amplifies a frequency of a transmitted signal, an RF receiver that amplifies a received signal with low noise and down-converts a frequency, and the like. However, this is only an embodiment of the transceiver 1610, and the elements of the transceiver 1610 are not limited to the RF transmitter and the RF receiver. The transceiver 1610 may receive a signal via a wireless channel, may output the same to at least one processor 1620, and may transmit the signal output from at least one processor 1620, via the wireless channel.

At least one processor 1620 is an element for overall control of the bundle management server. The processor 1620 may control overall operations of the bundle management server according to various embodiments as described above. The at least one processor 1620 may be referred to as a controller.

According to some embodiments, the at least one processor 1620 may select a certificate of the bundle management server, which is to be transmitted to the terminal, and certificate information to be used by the SSP of the terminal, may verify authentication information (SSP credential) of the SSP of the terminal, and may generate SPBMToken and a bound bundle.

According to some embodiments, the at least one processor 1620 may transmit the certificate of the bundle management server, the certificate information to be used by the SSP, the bundle family identifier, the bound bundle, etc. to the terminal, and may control the transceiver 1610 to receive certificate information corresponding to the specific bundle family identifier, the authentication information of the SSP, etc. from the terminal.

The bundle management server may further include a memory (not illustrated), and may store data, such as a default program, an application program, and configuration information for operations of the bundle management server. The memory may include at least one storage medium from among a flash memory type, a hard disk type, a multimedia card micro type, a card type memory (e.g., SD or XD memory, etc.), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM). The processor 1620 may perform various operations by using various programs, contents, data, etc. stored in the memory.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via another element (e.g., third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., program) including instructions stored in a machine-readable storage medium (e.g., internal memory or external memory) that is readable by a machine (e.g., computer). The machine is a device that can invoke the stored instructions from the storage medium and operate according to the invoked instructions, and may include the terminal 250 according to various embodiments. When the instructions are executed by a processor (e.g., the processor 820 in FIG. 8 or the processor 920 in FIG. 9), the processor may perform functions corresponding to the instructions, with or without using other components under the control of the processor. The instructions may include a code generated by a complier or a code executable by an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

The methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a local bundle assistant (LBA) included in a terminal in a wireless communication system, the method comprising:
    receiving, from a server, a remote bundle management command;
    verifying a first bundle policy based on the remote bundle management command;
    transmitting, to a secondary platform bundle loader (SPBL) included in the terminal, the remote bundle management command; and
    receiving, from the SPBL, an execution result of the remote bundle management command,
    wherein a second bundle policy is verified by the SPBL, based on the remote bundle management command, and
    wherein the remote bundle management command is executed by the terminal after the first bundle policy and the second bundle policy are verified.

2. The method of claim 1, wherein the remote bundle management command comprises at least one of information on server verification, information on a user consent, or information on a subscriber consent.

3. The method of claim 1, wherein the SPBL verifies an authorization of the server based on the remote bundle management command.

4. The method of claim 1, wherein the verifying of the first bundle policy comprises verifying a user consent.

5. The method of claim 1, wherein verification of the second bundle policy comprises verifying a subscriber consent.

6. A method performed by a secondary platform bundle loader (SPBL) included in a terminal in a wireless communication system, the method comprising:
    receiving, from a local bundle assistant (LBA) included in the terminal, a remote bundle management command;
    verifying a second bundle policy based on the remote bundle management command; and
    transmitting, to the LBA, an execution result of the remote bundle management command,
    wherein the remote bundle management command is transmitted from a server to the LBA,
    wherein a first bundle policy is verified by the LBA, based on the remote bundle management command, and
    wherein the remote bundle management command is executed by the terminal after the first bundle policy and the second bundle policy are verified.

7. The method of claim 6, wherein the remote bundle management command comprises at least one of information on server verification, information on a user consent, or information on a subscriber consent.

8. The method of claim 6, further comprising:
    verifying an authorization of the server based on the remote bundle management command.

9. The method of claim 6, wherein verification of the first bundle policy comprises verifying a user consent.

10. The method of claim 6, wherein the verifying of the second bundle policy comprises verifying a subscriber consent.

11. A local bundle assistant (LBA) included in a terminal, the LBA comprising:
    a transceiver capable of transmitting or receiving at least one signal, and
    a controller coupled with the transceiver, wherein the controller is configured to:
    receive, from a server, a remote bundle management command,
    verify a first bundle policy based on the remote bundle management command,
    transmit, to a secondary platform bundle loader (SPBL) included in the terminal, the remote bundle management command, and
    receive, from the SPBL, an execution result of the remote bundle management command,
    wherein a second bundle policy is verified by the SPBL, based on the remote bundle management command, and
    wherein the remote bundle management command is executed by the terminal after the first bundle policy and the second bundle policy are verified.

12. The LBA of claim 11, wherein the remote bundle management command comprises at least one of information on server verification, information on a user consent verification, or information on a subscriber consent.

13. The LBA of claim 11, wherein the SPBL verifies an authorization of the server based on the remote bundle management command.

14. The LBA of claim 11, wherein the controller is configured so that verification of the first bundle policy comprises verifying a user consent.

15. The LBA of claim 11, wherein verification of the second bundle policy comprises verifying a subscriber consent.

16. A secondary platform bundle loader (SPBL) included in a terminal, the SPBL comprising:
    a transceiver capable of transmitting or receiving at least one signal, and
    a controller coupled with the transceiver, wherein the controller is configured to:
    receive, from a local bundle assistant (LBA) included in the terminal, a remote bundle management command,
    verify a second bundle policy based on the remote bundle management command, and
    transmit, to the LBA, execution results of the remote bundle management command,
    wherein the remote bundle management command is transmitted to the LBA from a server,
    wherein a first bundle policy is verified by the LBA, based on the remote bundle management command, and
    wherein the remote bundle management command is executed by the terminal after the first bundle policy and the second bundle policy are verified.

17. The SPBL of claim 16, wherein the remote bundle management command comprises at least one of information on server verification, information on a user consent, or information on a subscriber consent.

18. The SPBL of claim 16, wherein the controller further is configured so that verify an authorization of the server based on the remote bundle management command.

19. The SPBL of claim 16, wherein verification of the first bundle policy is configured to verify a user consent.

20. The SPBL of claim 16, wherein the controller is configured so that verification of the second bundle policy comprises verifying a subscriber consent.

* * * * *